(12) United States Patent
Tominaga et al.

(10) Patent No.: US 8,238,219 B2
(45) Date of Patent: Aug. 7, 2012

(54) OPTICAL INFORMATION RECORDING/REPRODUCING DEVICE, OPTICAL UNIT, AND OPTICAL INFORMATION RECORDING METHOD

(75) Inventors: Shin Tominaga, Tokyo (JP); Ryuichi Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 21 days.

(21) Appl. No.: 12/922,782

(22) PCT Filed: Apr. 20, 2009

(86) PCT No.: PCT/JP2009/057857
§ 371 (c)(1),
(2), (4) Date: Sep. 15, 2010

(87) PCT Pub. No.: WO2009/131097
PCT Pub. Date: Oct. 29, 2009

(65) Prior Publication Data
US 2011/0026390 A1 Feb. 3, 2011

(30) Foreign Application Priority Data
Apr. 21, 2008 (JP) ................ 2008-109874

(51) Int. Cl.
*G11B 7/00* (2006.01)
(52) U.S. Cl. ............... 369/112.16; 369/103; 369/112.01
(58) Field of Classification Search .................. 369/103, 369/112.01, 112.16
See application file for complete search history.

(56) References Cited

U.S. PATENT DOCUMENTS

| | | | |
|---|---|---|---|
| 6,650,615 B1 * | 11/2003 | Yamamoto et al. | 369/275.1 |
| 7,154,645 B2 * | 12/2006 | Yasuda et al. | 359/11 |
| 7,426,168 B2 * | 9/2008 | Kawano et al. | 369/103 |
| 2001/0002895 A1 * | 6/2001 | Kawano et al. | 369/103 |
| 2004/0066728 A1 * | 4/2004 | Gu et al. | 369/103 |

FOREIGN PATENT DOCUMENTS

| JP | 2001006208 A | 1/2001 |
|---|---|---|
| JP | 2001290408 A | 10/2001 |
| JP | 2005316279 A | 11/2005 |

OTHER PUBLICATIONS

International Search Report for PCT/JP2009/057857 mailed Jun. 30, 2009.
M. Dubois et al., "Microholograms Recorded in a Thermoplastic Medium for Three-Dimensional Data Storage", Japanese Journal of Applied Physics, vol. 45, No. 2B, 2006, pp. 1239-1245.

* cited by examiner

*Primary Examiner* — Wayne Young
*Assistant Examiner* — Brenda Bernardi
(74) *Attorney, Agent, or Firm* — Michael Dryja

(57) ABSTRACT

An optical unit is provided with a light source; a light dividing means for dividing light emerging from the light source into a first light and a second light; a light converging means for converging the first and second lights at the same position in the recording layer in the manner that they face each other; a polarization state switching means for switching the polarization states of the first and second lights at the convergence point in the recording layer; and a light irradiation state switching means for switching between the state in which the optical cording medium is irradiated with both the first light and the second light and the state in which the optical recording medium is irradiated with only one of the first and second lights.

10 Claims, 16 Drawing Sheets

OPTICAL INFORMATION RECORDING/REPRODUCING DEVICE, OPTICAL UNIT, AND OPTICAL INFORMATION RECORDING METHOD

This application is the National Phase of PCT/JP2009/057857, filed Apr. 20, 2009, which claims the benefit of Japanese Patent Application No. 2008-109874 filed on Apr. 21, 2008, the entire disclosure of which is incorporated by reference herein.

TECHNICAL FIELD

The present invention relates to an optical information recording/reproducing device and more specifically to an optical information recording/reproducing device three-dimensionally recording/reproducing information on an optical recording medium having a recording layer in which the polarization state of light can be recorded. The present invention further relates to an optical unit that can be used in such an optical information recording/reproducing device and an optical information recording method for optical recording media.

BACKGROUND ART

One of the techniques for achieving large capacity optical recording media is three-dimensional recording/reproducing. Three-dimensional recording/reproducing utilizes the dimension in the thickness direction in addition to the dimension in the in-plane direction of an optical recording medium, thereby three-dimensionally recording/reproducing information on an optical recording medium.

One of the three-dimensional recording/reproducing techniques is called microhologram recording. In microhologram recording, two facing lights are made to converge at the same point in the recording layer of an optical recording medium so that they interfere with each other and form a small diffraction grating near the convergence point for recording information. Then, either one of the two lights is made to converge at the diffraction grating and the reflected light from the diffraction grating is received for reproducing the information.

Non-Patent Literature 1 describes an optical unit used in the above microhologram recording. FIG. 19 shows the optical unit described in the Non-Patent Literature 1. Light emerging from a laser 143 has the beam diameter enlarged after transmission through a beam expander 144 and, after transmission through a λ/2 plate 145, becomes a linearly polarized light having a polarization direction of 45° with respect to the sheet surface in a plane perpendicular to the optical axis. Approximately 50% of the light is transmitted through a polarized beam splitter 146 and approximately 50% is reflected by the polarized beam splitter 146.

For recording information on a recording medium 158, the light transmitted through the polarized beam splitter 146 is reflected by mirrors 153 and 154 and almost 100% of the light is transmitted through a polarized beam splitter 155. Transmitted through a λ/4 plate 156, the light is transformed from a linearly polarized light to a circularly polarized light. An objective lens 157 converges the light in the recording layer of a recording medium 158. On the other hand, the light reflected by the polarized beam splitter 146 is reflected by mirrors 147, 148, and 149, passes through a shutter 150, and is transmitted through a λ/4 plate 151, whereby it is transformed from a linearly polarized light to a circularly polarized light rotating in the opposite direction to the above circularly polarized light. An objective lens 152 converges the light in the recording layer of the recording medium 158.

For reproducing information from the recording medium 158, the light transmitted through the polarized beam splitter 146 is heading for the recording medium 158 in the same way as for recording. Meanwhile, with the shutter 150 being closed, the light reflected by the polarized beam splitter 146 is blocked by the shutter 150, not heading for the recording medium 158. The light transmitted through the polarized beam splitter 146 converges in the recording layer of the recording medium 158. The light is partly reflected by the recording layer of the recording medium 158, passes through the objective lens 157 in the reverse direction, and is transmitted through the λ/4 plate 156, whereby it is transformed from a circularly polarized light to a linearly polarized light having a polarization direction perpendicular to that in the outward travel. Almost 100% of the light is reflected by the polarized beam splitter 155 and converged by a convex lens 159 on the light reception part of a detector 160.

Another three-dimensional recording/reproducing technique is called page hologram recording. For recording in page hologram recording, two lights called information light and reference light are used. The intensity profile of information light in a cross-section perpendicular to the optical axis is modulated according to recording data. Then, the two lights are made to enter the recording layer of an optical recording medium so as to form a hologram in the recording layer for recording information. For reproduction, only the reference light of the two lights is made to enter the recording layer of the recording medium to detect the intensity profile of the diffracted light from the hologram in a cross-section perpendicular to the optical axis for reproducing information.

Patent Literature 1 describes a recording medium and optical unit used in the above page hologram recording. The recording medium described in the Patent Literature 1 utilizes azobenzene as the material of the recording layer. Azobenzene exhibits birefringence, having a higher refractive index to the polarization components parallel to the molecular orientation than to the polarization components perpendicular to the molecular orientation. Irradiated with a linearly polarized light, the molecules are oriented in the direction perpendicular to the polarization direction. Then, the polarization state of light can be recorded. In the optical unit described in the Patent Literature 1, the information light and reference light enter the recording layer of a recording medium as P polarization and S polarization, respectively. The polarization state of the composite light of the two is recorded in the recording layer as hologram. Here, when only the reference light enters the recording layer of the recording medium as S polarization, the diffracted light from the hologram exhibits P polarization.

Patent Literature 1: Unexamined Japanese Patent Application KOKAI Publication No. 2005-316279.
Non-Patent Literature 1: Japanese Journal of Applied Physics, Vol. 45, No. 2B, pp. 1239-1245 (2006).

DISCLOSURE OF INVENTION

It is desirable that an optical information recording/reproducing device can not only add information but also rewrite information. In doing so, it is desirable that old information is automatically deleted when new information is recorded instead of first deleting old information and then recording new information. In other words, capability of overwriting information is desirable.

In the optical unit described in the Non-Patent Literature 1, the intensity of light emerging from the laser 143 is modulated according to recording data. Light emerges from the laser 143 for recording bit data "1." Light does not emerge from the laser 143 for recording bit data "0." Two lights fall on parts where bit data "1" are recorded in the recording layer of a recording medium. The two lights interfere with each other and create an optical intensity profile. A refractive index profile according to the intensity profile is recorded. On the other hand, the two lights do not fall on parts where bit data "0" are recorded; no optical intensity profile is created and no refractive index profile is recorded. Therefore, in order to record bit data "0" in the parts where bit data "1" have been recorded, the refractive index profile according to an optical intensity profile should be deleted prior to the recording. For this reason, the optical unit described in the Non-Patent Literature 1 does not have capability of overwriting information.

On the other hand, in the optical unit described in the Patent Literature 1, the intensity profile of information light in a cross-section perpendicular to the optical axis is modulated by a spatial light modulator according to recording data. Information light emerges from the on-state pixels of the spatial light modulator while it does not from the off-state pixels. The parts in the recording layer of a recording medium that correspond to the on-state pixels of the spatial light modulator receive the information light and reference light, whereby the composite light of the two produces a polarization profile. Then, the molecular orientation profile according to the polarization profile is recorded. On the other hand, the parts that correspond to the off-state pixels of the spatial light modulator receive no information light, whereby no polarization profile occurs and no molecular orientation profile is recorded. For this reason, in order to make the parts corresponding to on-state pixels correspond to off-state pixels, the molecular orientation profile according to an optical polarization profile should be deleted prior to recording. For this reason, the optical unit described in the Patent Literature 1 does not have capability of overwriting information, either.

The purpose of the present invention is to provide an optical information recording/reproducing device capable of overwriting information in three-dimensionally recording information on an optical recording medium, an optical unit used with it, and an optical information recording method.

In order to achieve the above purpose, the present invention provides an optical information recording/reproducing device intended for the use of an optical recording medium having a recording layer in which the polarization state of light can be recorded, comprising a light source; a light dividing means for dividing light emerging from the light source into a first light and a second light; a light converging means for converging the first and second lights at the same position in the recording layer in the manner that they face each other; a polarization state switching means for switching the polarization states of the first and second lights at the convergence point in the recording layer; a polarization state switching means drive circuit driving the polarization state switching means according to recording data upon recording of information on the optical recording medium; a light irradiation state switching means for switching between the state in which the optical recording medium is irradiated with both the first light and the second light and the state in which the optical recording medium is irradiated with only one of the first and second lights; and a light irradiation state switching means drive circuit driving the light irradiation state switching means in the manner that both the first light and the second light irradiate the optical recording medium as recording light upon recording of information on the optical recording medium and only one of the first and second lights irradiates the optical recording medium as reproducing light upon reproduction of information from the optical recording medium.

The present invention provides an optical unit used in an optical information recording/reproducing device intended for the use of an optical recording medium having a recording layer in which the polarization state of light can be recorded, comprising a light source; a light dividing means for dividing light emerging from the light source into a first light and a second light; a light converging means for converging the first and second lights at the same position in the recording layer in the manner that they face each other; a polarization state switching means for switching the polarization states of the first and second lights at the convergence point in the recording layer; and a light irradiation state switching means for switching between the state in which the optical recording medium is irradiated with both the first light and the second light and the state in which the optical recording medium is irradiated with only one of the first and second lights.

The present invention provides an optical information recording method wherein light emerging from a light source is divided into a first light and a second light; the first and second lights are made to converge at the same position in the recording layer of an optical recording medium in which the polarization state of light can be recorded in the manner that they face each other; the polarization states of the first and second lights at the convergence point in the recording layer are switched according to recording data to record the polarization profile at the convergence point of the first and second lights.

The optical information recording/reproducing device, optical unit, and optical information recording method of the present invention are capable of overwriting information in three-dimensionally recording information on an optical recording medium.

The above and other purposes, characteristics, and benefits of the present invention will be apparent from the explanation below given with reference to the drawings.

BEST MODE FOR CARRYING OUT THE INVENTION

Figure 1:
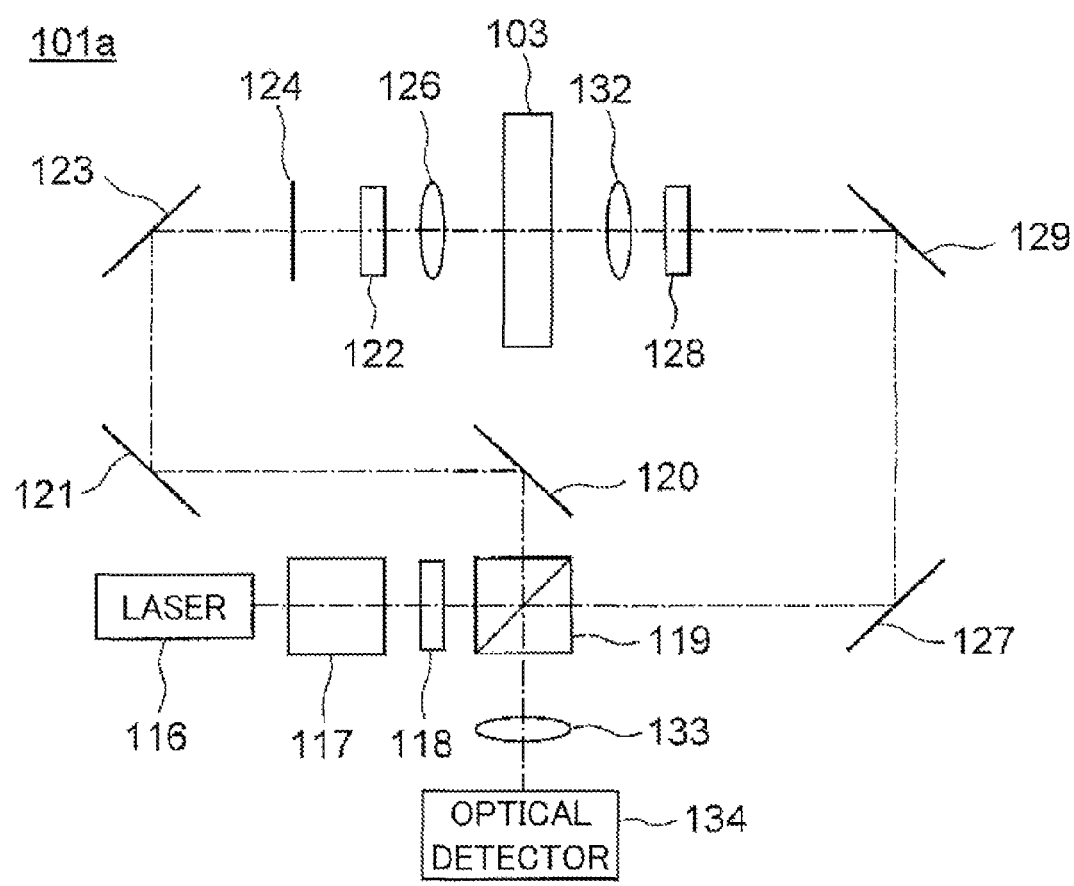
FIG. 1 A block diagram showing an optical unit of Embodiment 1 of the present invention.

Embodiments of the present invention will be described hereafter with reference to the drawings. First, Embodiment 1 of the present invention will be described. FIG. 1 shows an optical unit of Embodiment 1 of the present invention. An optical unit 101a of this embodiment has a laser 116, a beam expander 117, a λ/2 plate 118, a polarized beam splitter 119, mirrors 120, 121, 123, 127, and 129, active wavelength plates 122 and 128, a shutter 124, objective lenses 126 and 132, a convex lens 133, and an optical detector 134. A recording medium 103 has a recording layer in which the polarization state of light can be recorded.

The laser 116 corresponds to a light source. The laser 116 can be a single mode semiconductor laser using a diffraction grating as an external oscillator. Light emerging from the laser 116 has a wavelength of 405 nm. The beam expander 117 enlarges the beam diameter of the incident light. The polarized beam splitter 119 transmits almost 100% of P polarization components and reflects almost 100% of S polarization components of the incident light. Here, the polarized beam splitter 119 corresponds to a light dividing means.

The active wavelength plates 122 and 128 can be switched between serving as a λ plate and serving as a λ/2 plate for the incident light. Here, the active wavelength plates 122 and 128 correspond to a polarization state switching means. The shutter 124 can mechanically be opened/closed so that the incident light is blocked or not blocked. Here, the shutter 124 corresponds to a light irradiation state switching means.

The active wavelength plates 122 and 128 are controlled to serve as a λ plate or as a λ/2 plate for the incident light according to recording data upon recording of information on the recording medium 103. The active wavelength plate 128 is controlled to serve as a λ plate for the incident light upon reproduction of information from the recording medium 103. The shutter 124 is controlled to open upon recording of information on the recording medium 103 and to close upon reproduction of information from the recording medium 103.

The objective lenses 126 and 132 converge the incident light in the recording layer of the recording medium 103. Here, the objective lenses 126 and 132 correspond to a light converging means. The optical detector 134 outputs electric signals according to the amount of light entering the light reception part. The convex lens 133 converges the incident light on the light reception part of the optical detector 134.

Light emerging from the laser 116 has the beam diameter enlarged after transmission through the beam expander 117 and becomes a linearly polarized light having a polarization direction of 45° with respect to the sheet surface in a cross-section perpendicular to the optical axis after transmission through the λ/2 plate 118. Approximately 50% of the light is transmitted through the polarized beam splitter 119 as P polarization components and approximately 50% is reflected by the polarized beam splitter 119 as S polarization components. The light transmitted through the polarized beam splitter 119 is referred to as the first light and the light reflected by the polarized beam splitter 119 is referred to as the second light in the explanation below. Incidentally, it will be no problem that the light reflected by the polarized beam splitter 119 is referred to as the first light and the light transmitted through the polarized beam splitter 119 is referred to as the second light.

For recording bit data "1" on the recording medium 103, the first light is reflected by the mirrors 127 and 129 to enter the active wavelength plate 128. The active wavelength plate 128 is controlled to serve as a λ plate for recording bit data "1" on the recording medium 103. Then, the light entering the active wavelength plate 128 is transmitted through the active wavelength plate 128 without any change in polarization state. The objective lens 132 converges the light in the recording layer of the recording medium 103. The polarization state of the first light at the convergence point in the recording layer in this event corresponds to a first linear polarization.

On the other hand, the second light is reflected by the mirrors 120, 121, and 123 to enter the active wavelength plate 122 via the shutter 124. The active wavelength plate 122 is controlled to serve as a λ plate for recording bit data "1" on the recording medium 103. Then, the light entering the active wavelength plate 122 is transmitted through the active wavelength plate 122 without any change in polarization state. The objective lens 126 converges the light in the recording layer of the recording medium 103. The polarization state of the second light at the convergence point in the recording layer in this event corresponds to a second linear polarization.

For recording bit data "0" on the recording medium 103, the first light is reflected by the mirrors 127 and 129 to enter the active wavelength plate 128. The active wavelength plate 128 is controlled to serve as a λ/2 plate for recording bit data "0" on the recording medium 103. Then, the light entering the active wavelength plate 128 is transmitted through the active wavelength plate 128 with the polarization direction rotated by 45°. The objective lens 132 converges the light in the recording layer of the recording medium 103. The polarization state of the first light at the convergence point in the recording layer in this event corresponds to a third linear polarization.

On the other hand, the second light is reflected by the mirrors 120, 121, and 123 to enter the active wavelength plate 122 via the shutter 124. The active wavelength plate 122 is controlled to serve as a λ/2 plate for recording bit data "0" on the recording medium 103. Then, the light entering the active wavelength plate 122 is transmitted through the active wavelength plate 122 with the polarization direction rotated by 45°. The objective lens 126 converges the light in the recording layer of the recording medium 103. The polarization state of the second light at the convergence point in the recording layer in this event corresponds to a fourth linear polarization.

For reproducing information from the recoding medium 103, the first light is reflected by the mirrors 127 and 129 to enter the active wavelength plate 128. The light entering the active wavelength plate 128 is transmitted through the active wavelength plate 128 without any change in polarization state. The objective lens 132 converges the light in the recording layer of the recording medium 103. Here, blocked by the shutter 124, the second light does not head for the recording medium 103.

When bit data "1" are recorded at the convergence point, the light having converged in the recording layer of the recording medium 103 is partly reflected at the convergence point as a linearly polarized light having a polarization direction perpendicular to that of the outgoing light, passes through the objective lens 132 in the reverse direction, and is transmitted through the active wavelength plate 128 without any change in polarization state. The transmitted light is reflected by the mirrors 129 and 127. Almost 100% of the light is reflected by the polarized beam splitter 119. The convex lens 133 converges the light on the light reception part of the optical detector 134. With light being received at the light reception part of the optical detector 134, it is determined that the information recorded at the convergence point is bit data "1."

On the other hand, when bit data "0" are recorded at the convergence point, the light having converged in the recording layer of the recording medium 103 is partly reflected as a linearly polarized light having the same polarization direction as the outgoing light. Almost 100% of the reflected light is transmitted through the polarized beam splitter 119, not heading for the optical detector 134. With no light being received at the light reception part of the optical detector 134, it is determined that the information recorded at the convergence point is bit data "0."

In the above description, the active wavelength plate 128 serves as a λ plate for reproducing information from the recording medium 103. The active wavelength plate 128 can serve as a λ/2 plate. In such a case, the light reception part of the optical detector 134 receives no light when bit data "1" are recorded at the convergence point. Conversely, the light reception part of the optical detector 134 receives light when bit data "0" are recorded at the convergence point.

Electrooptical crystal can be used for the active wavelength plates 122 and 128. Active wavelength plates using electrooptical crystal are described, for example, in "Light Wave Engineering, Toshiaki Suhara, Corona, pp. 189-201." The active wavelength plates 122 and 128 consist of electrooptical crystal having uniaxially anisotropic refractive index interposed between a pair of planar electrodes parallel to the optical axis of the incident light. Usable electrooptical crystal materials include lithium niobate. The optical axis of electrooptical crystal is perpendicular to the surfaces of the pair of electrodes.

When a voltage is applied to electrooptical crystal by a pair of electrodes, the refractive index of the electrooptical crystal changes due to electrooptical effect. The quantity of change in the refractive index is different between the polarization components parallel to the optical axis and the polarization components perpendicular to the optical axis. Here, it is assumed that the length of the electrooptical crystal in the optical axis direction of the incident light is T, the wavelength of the incident light is λ, and the difference in refractive index between the polarization components parallel to the optical axis and the polarization components perpendicular to the optical axis changes from Δn0 to Δn1 as a voltage is applied. T is so determined as to satisfy Δn0T=mλ (m is an integer). It is assumed that a voltage V1 leads to Δn1T=mλ+(λ/2). Here, the active wavelength plates 122 and 128 serve as a λ plate when no voltage is applied and serve as a λ/2 plate when the voltage V1 is applied. Assuming that the polarization direction of the incident light is at 22.5° with respect to the optical axis, the active wavelength plates 122 and 128 do not change the polarization state of the transmitted light when no voltage is applied and rotate the polarization direction of the transmitted light by 45° when the voltage V1 is applied.

Figure 2:
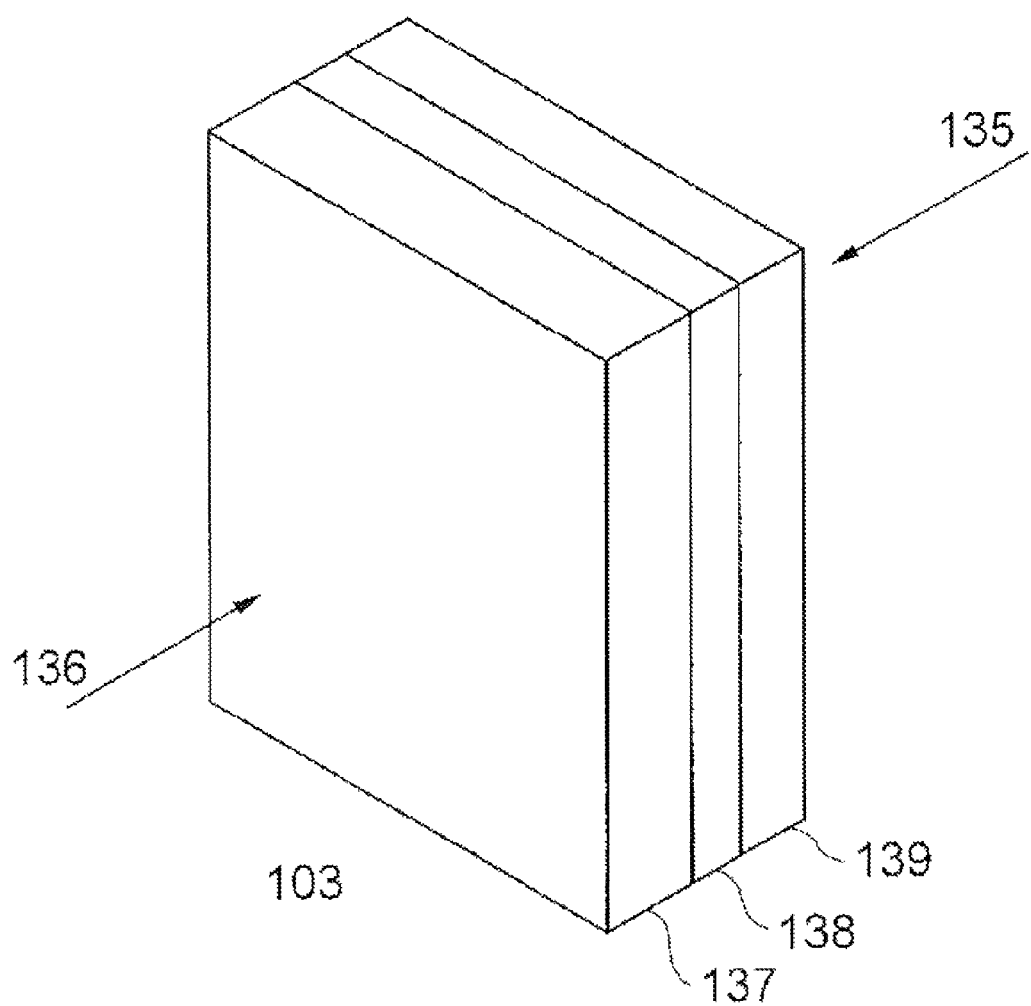
FIG. 2 A perspective view of a recording medium having a first entrance face and a second entrance face.

FIG. 2 shows the recording medium 103. The recording medium 103 consists of a recording layer 138 interposed between substrates 137 and 139. The recording layer 138 is made of azobenzene. The polarization state of light can be recorded in the recording layer 138. Beams 135 and 136 are the first and second lights, respectively. The beam 135 enters the recording layer 138 from the substrate 139. The beam 136 enters the recording layer 138 from the substrate 137. Here, the substrate 139 corresponds to a first entrance face and the substrate 139 corresponds to a second entrance face. The recording medium 103 corresponds to an optical recording medium having a first entrance face and a second entrance face.

Figure 3:
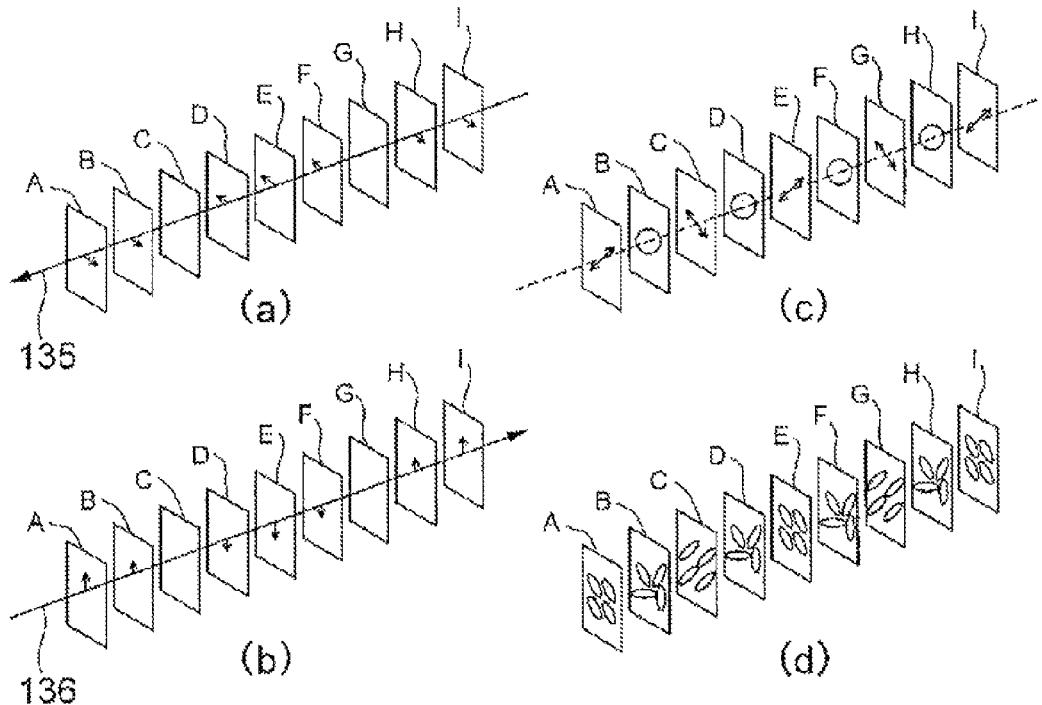
FIG. 3 (a) to (d) are illustrations showing mechanism of recording bit data "1" with the use of linearly polarized light.

Recording of information on the recording medium 103 will be described. FIGS. 3 (*a*) to 3 (*d*) show mechanism of recording bit data "1." In FIGS. 3 (*a*) to 3 (*d*), cross-sections A to I are cross-sections perpendicular to the optical axis at positions dividing the length of one wavelength into eight equal sections along the optical axis of the beams 135 and 136 that are recording lights.

FIG. 3 (*a*) shows the electric field vectors of the beam 135 near the convergence point in the recording layer 138 at a time t. Based on the phase of the beam 135 in the cross-section A, the phase in a cross-section A is 0, the phase in a cross-section B is π/4, the phase in a cross-section C is π/2, the phase in a cross-section D is π/4, the phase in a cross-section E is π, the phase in a cross-section F is 5π/4, the phase in a cross-section G is 3π/2, the phase in a cross-section H is 7π/4, and the phase in a cross-section I is 2π. The electric field vectors change in magnitude, creating a sinusoidal curve in the direction of 0° from the cross-section A to the cross-section I.

FIG. 3 (*b*) shows the electric field vectors of the beam 136 near the convergence point in the recording layer 138 at a time t. Based on the phase of the beam 136 in the cross-section I, the phase in a cross-section A is 2π, the phase in a cross-section B is 7π/4, the phase in a cross-section C is 3π/2, the phase in a cross-section D is 5π/4, the phase in a cross-section E is π, the phase in a cross-section F is 3π/4, the phase in a cross-section G is 3π/2, the phase in a cross-section H is 7π/4, and the phase in a cross-section I is 0. The electric field vectors change in magnitude, creating a sinusoidal curve in the direction of 90° from the cross-section I to the cross-section A.

FIG. 3 (*c*) shows the polarization profile of the composite light of the beams 135 and 136 near the convergence point in the recording layer 138. The electric field vectors of the beam 135 shown in FIG. 3 (*a*) and the electric field vectors of the beam 136 shown in FIG. 3 (*b*) change in magnitude with the time in the cross-sections A to I. On the other hand, the electric field vectors of the composite light of the two change in magnitude with the time in the cross-sections A, C, E, G, and I and change in direction in the cross-sections B, D, F, and H. The composite light of the beams 135 and 136 is a linearly polarized light having a polarization direction of 45° in the cross-sections A, E, and I, a linearly polarized light having a polarization direction of 135° in the cross-sections C and G, a circularly polarized light rotating counterclockwise seen from the cross-section A in the cross-sections B and F, and a circularly polarized light rotating clockwise seen from the cross-section A in the cross-sections D and H.

FIG. 3 (*d*) shows the orientation profile of azobenzene molecules oriented in association with the composite light of the beams 135 and 136 near the convergence point in the recording layer 138. The azobenzene molecules are oriented in the direction perpendicular to the polarization direction under a linearly polarized light and oriented randomly under a circularly polarized light. Therefore, the orientation is at 135° in the cross-sections A, E, and I, at 45° in the cross-sections C and G, and random in the cross-sections B, D, F, and H.

Figure 4:
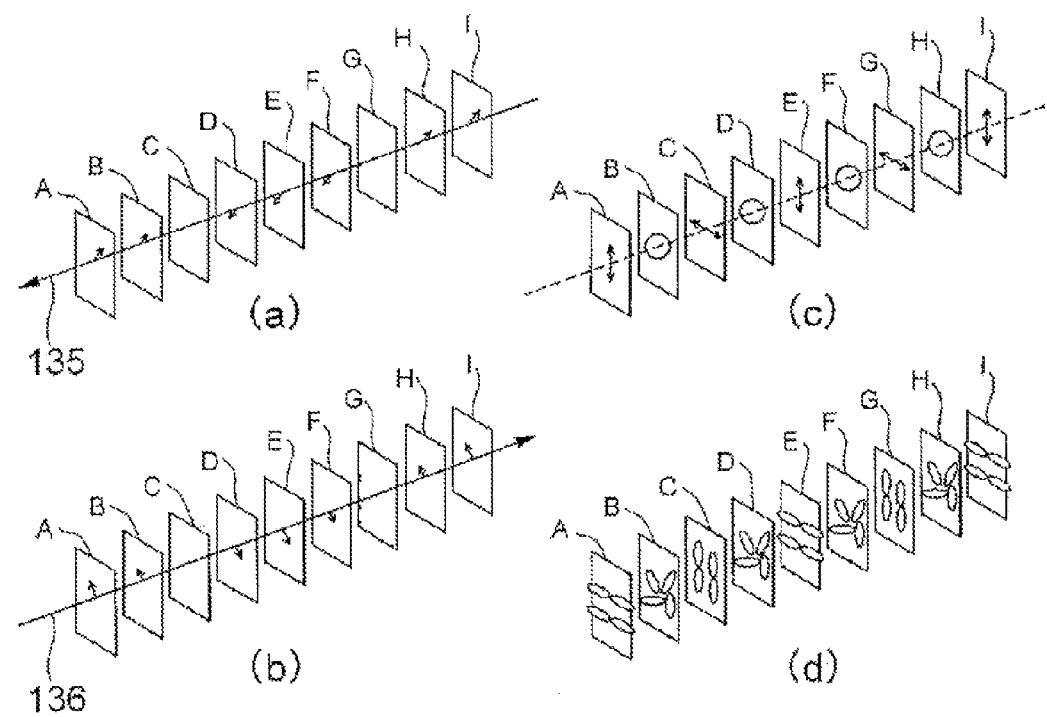
FIG. 4 (a) to (d) are illustrations showing mechanism of recording bit data "0" with the use of linearly polarized light.

FIGS. 4 (a) to 4 (d) show mechanism of recording bit data "0." In FIGS. 4 (a) to 4 (d), cross-sections A to I are cross-sections perpendicular to the optical axis at positions dividing the length of one wavelength into eight equal sections along the optical axis of the beams 135 and 136.

FIG. 4 (a) shows the electric field vectors of the beam 135 near the convergence point in the recording layer 138 at a time t. Based on the phase of the beam 135 in the cross-section A, the phase in a cross-section A is 0, the phase in a cross-section B is $\pi/4$, the phase in a cross-section C is $\pi/2$, the phase in a cross-section D is $3\pi/4$, the phase in a cross-section E is $\pi/2$, the phase in a cross-section F is $3\pi/4$, the phase in a cross-section G is $3\pi/2$, the phase in a cross-section H is $7\pi/4$, and the phase in a cross-section I is $2\pi$. The electric field vectors change in magnitude, creating a sinusoidal curve in a direction of 45° from the cross-section A to the cross-section I.

FIG. 4 (b) shows the electric field vectors of the beam 136 near the convergence point in the recording layer 138 at a time t. Based on the phase the beam 136 in the cross-section I, the phase in a cross-section A is $2\pi$, the phase in a cross-section B is $7\pi/4$, the phase in a cross-section C is $3\pi/2$, the phase in a cross-section D is $5\pi/4$, the phase in a cross-section E is $\pi$, the phase in a cross-section F is $3\pi/4$, the phase in a cross-section G is $\pi/2$, the phase in a cross-section H is $\pi/4$, and the phase in a cross-section I is 0. The electric field vectors change in magnitude, creating a sinusoidal curve in a direction of 135° from the cross-section I to the cross-section A.

FIG. 4 (c) shows the polarization profile of the composite light of the beams 135 and 136 near the convergence point in the recording layer 138. The electric field vectors of the beam 135 shown in FIG. 4 (a) and the electric field vectors of the beam 136 shown in FIG. 4 (b) change in magnitude with the time in the cross-sections A to I. On the other hand, the electric field vectors of the composite light of the two change in magnitude with the time in the cross-sections A, C, E, G, and I and change in direction with time the in the cross-sections B, D, F, and H. The composite light of the beams 135 and 136 is a linearly polarized light having a polarization direction of 90° in the cross-sections A, E, and I, a linearly polarized light having a polarization direction of 0° in the cross-sections C and G, a circularly polarized light rotating clockwise seen from the cross-section A in the cross-sections B and F, and a circularly polarized light rotating counter-clockwise seen from the cross-section A in the cross-sections D and H.

FIG. 4 (d) shows the orientation profile of azobenzene molecules oriented in association with the composite light of the beams 135 and 136 near the convergence point in the recording layer 138. The azobenzene molecules are oriented in the direction perpendicular to the polarization direction under a linearly polarized light and oriented randomly under a circularly polarized light. Therefore, the orientation is at 0° in the cross-sections A, E, and I, at 90° in the cross-sections C and G, and random in the cross-sections B, D, F, and H.

The azobenzene molecular orientation profile shown in FIG. 3 (d) is recorded in the parts corresponding to bit data "1" and the azobenzene molecular orientation profile shown in FIG. 4 (d) is recorded in the parts corresponding to bit data "0" in the recording layer 138. When bit data "1" are recorded in the parts where bit data "1" have been recorded, the azobenzene molecular orientation profile remains in the state shown in FIG. 3 (d). When bit data "0" are recorded in the parts where bit data "1" have been recorded, the azobenzene molecular orientation profile changes from the state shown in FIG. 3 (d) to the state shown in FIG. 4 (d).

On the other hand, when bit data "0" are recorded in the parts where bit data "0" have been recorded, the azobenzene molecular orientation profile remains in the state shown in FIG. 4 (d). When bit data "1" are recorded in the parts where bit data "0" have been recorded, the azobenzene molecular orientation profile changes from the state shown in FIG. 4 (d) to the state shown in FIG. 3 (d). In other words, there is no need of deleting the azobenzene molecular orientation profile prior to recording for recording bit data "0" or "1" in the parts where bit data "1" or "0" have been recorded.

Figure 5:
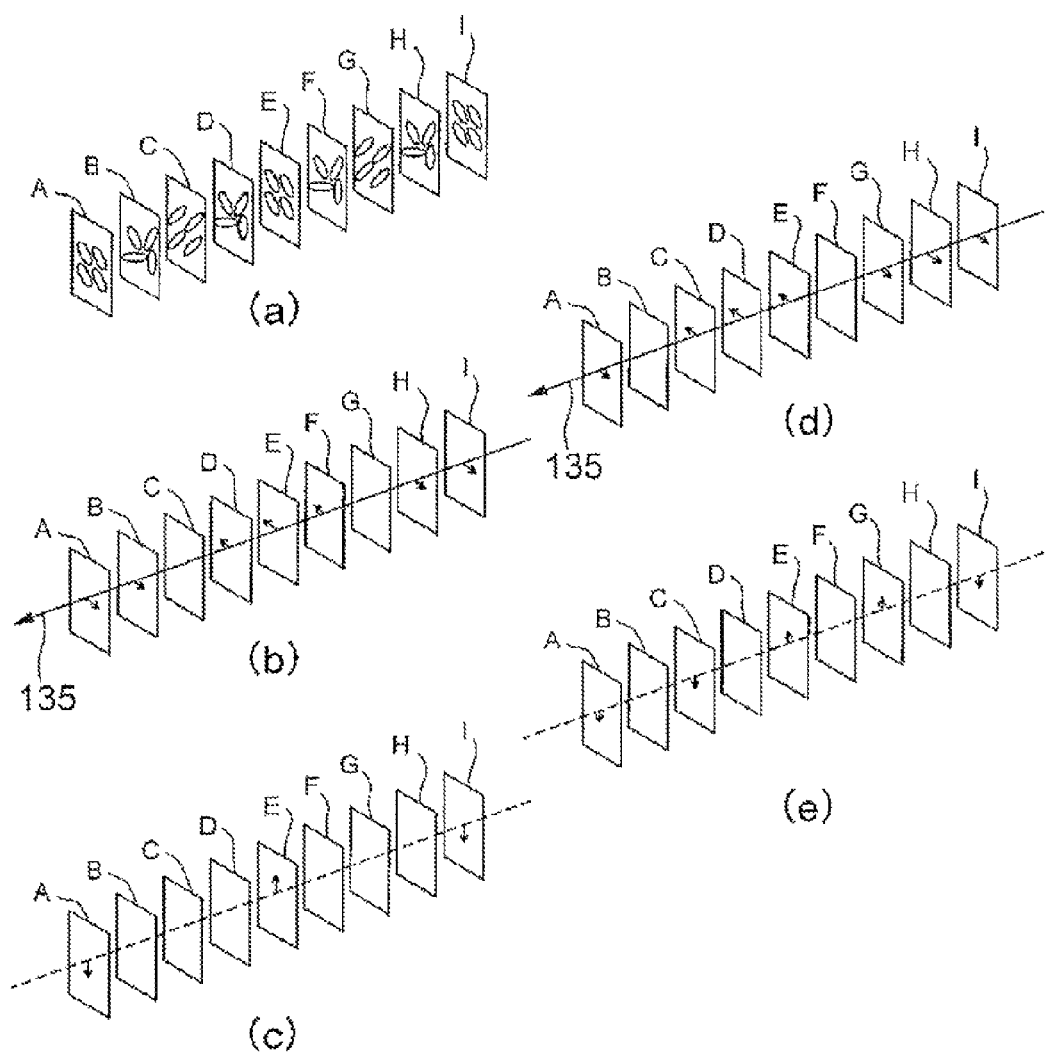
FIG. 5 (a) to (e) are illustrations showing mechanism of reproducing bit data "1" with the use of linearly polarized light.

Reproduction of information from the recording medium 103 will be described hereafter. FIGS. 5 (a) to 5 (e) show mechanism of reproducing bit data "1." In FIGS. 5 (a) to 5 (e), cross-sections A to I are cross-sections perpendicular to the optical axis at positions dividing the length of one wavelength into eight equal sections along the optical axis of the beam 135 that is reproducing light. FIG. 5 (a) is the same as FIG. 3 (d), showing the azobenzene molecular orientation profile recorded in the parts corresponding to bit data "1" near the convergence point in the recording layer 138.

FIG. 5 (b) shows the electric field vectors of the beam 135 near the convergence point in the recording layer 138 at a time t. FIG. 5 (c) shows the electric field vectors of light occurring at the positions in the cross-sections A to I at the time t. The light having the electric field vectors shown in FIG. 5 (b) interacts with the azobenzene molecules having the orientation profile shown in FIG. 5 (a), whereby other light occurs at the positions in the cross-sections A to I. Here, the electric field vectors of light occurring at the positions in the cross-sections A to I result from folding the electric field vectors of the original light in a line-symmetric manner about the azobenzene molecular orientation.

FIG. 5 (d) shows the electric field vectors of the beam 135 near the convergence point in the recording layer 138 at a time (t+Δt) when the beam 135 has advanced ⅛ wavelength since the time t. FIG. 5 (e) shows the electric field vectors of light occurring at the positions in the cross-sections A to I near the convergence point in the recording layer 138 at the time (t+Δt). The light having the electric field vectors shown in FIG. 5 (d) interacts with the azobenzene molecules having the orientation profile shown in FIG. 5 (a), whereby other light occurs at the positions in the cross-sections A to I. Here, the electric field vectors of light occurring at the positions in the cross-sections A to I result from folding the electric field vectors of the original light in a line-symmetric manner about the azobenzene molecular orientation.

It is understood from FIGS. 5 (c) and 5 (e) that the light occurring at the positions in the cross-sections A to I is a linearly polarized light having a polarization direction of 90° and travelling in the opposite direction to the beam 135. In other words, it is understood that when the beam 135 that is a linearly polarized light having a polarization direction of 0° converges in the parts corresponding to bit data "1" in the recording layer 138, it is partly reflected as a linearly polarized light having a polarization direction of 90°.

Figure 6:
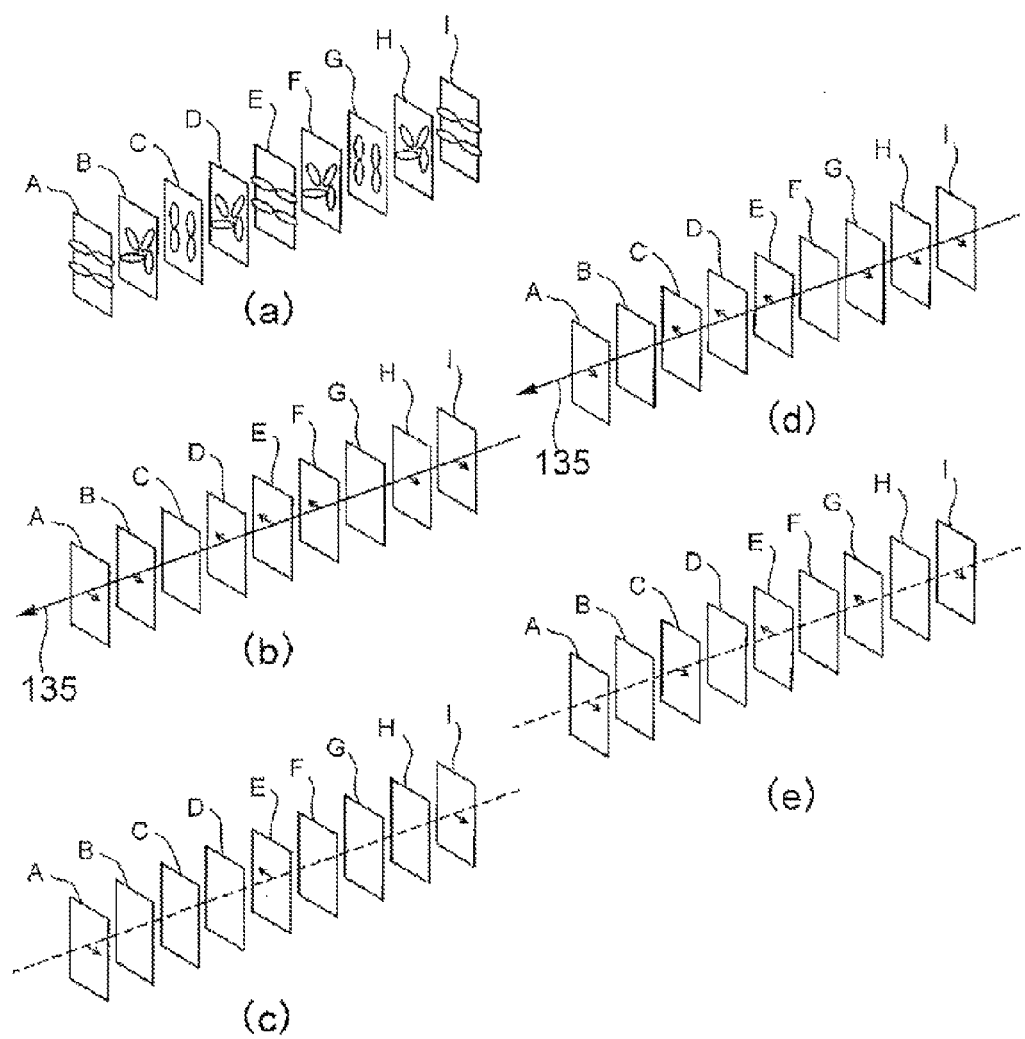
FIG. 6 (a) to (e) are illustrations showing mechanism of reproducing bit data "0" with the use of linearly polarized light.

FIGS. 6 (a) to 6 (e) show mechanism of reproducing bit data "0." In FIGS. 6 (a) to 6 (e), cross-sections A to I are cross-sections perpendicular to the optical axis at positions dividing the length of one wavelength into eight equal sections along the optical axis of the beam 135. FIG. 6 (a) is the same as FIG. 4 (d), showing the azobenzene molecular orientation profile recorded in the parts corresponding to bit data "0" near the convergence point in the recording layer 138.

FIG. 6 (b) shows the electric field vectors of the beam 135 near the convergence point in the recording layer 138 at a time t. FIG. 6 (c) shows the electric field vectors of light occurring at the positions in the cross-sections A to I at the time t. The light having the electric field vectors shown in FIG. 6 (b) interacts with the azobenzene molecules having the orientation profile shown in FIG. 6 (a), whereby other light occurs at the positions in the cross-sections A to I. Here, the electric field vectors of light occurring at the positions in the cross-sections A to I result from folding the electric field vectors of the original light in a line-symmetric manner about the azobenzene molecular orientation.

FIG. 6 (d) shows the electric field vectors of the beam 135 near the convergence point in the recording layer 138 at a time (t+Δt) when the beam 135 has advanced ⅛ wavelength since the time t. FIG. 6 (e) shows the electric field vectors of light occurring at the positions in the cross-sections A to I near the convergence point in the recording layer 138 at the time (t+Δt). The light having the electric field vectors shown in FIG. 6 (d) interacts with the azobenzene molecules having the orientation profile shown in FIG. 6 (a), whereby other light occurs at the positions in the cross-sections A to I. Here, the electric field vectors of light occurring at the positions in the cross-sections A to I result from folding the electric field vectors of the original light in a line-symmetric manner about the azobenzene molecular orientation.

It is understood from FIGS. 6 (c) and 6 (e) that the light occurring at the positions in the cross-sections A to I is a linearly polarized light having a polarization direction of 0° and travelling in the opposite direction to the beam 135. In other words, it is understood that when the beam 135 that is a linearly polarized light having a polarization direction of 0° converges in the parts corresponding to bit data "0" in the recording layer 138, it is partly reflected as a linearly polarized light having a polarization direction of 0°.

Figure 7:
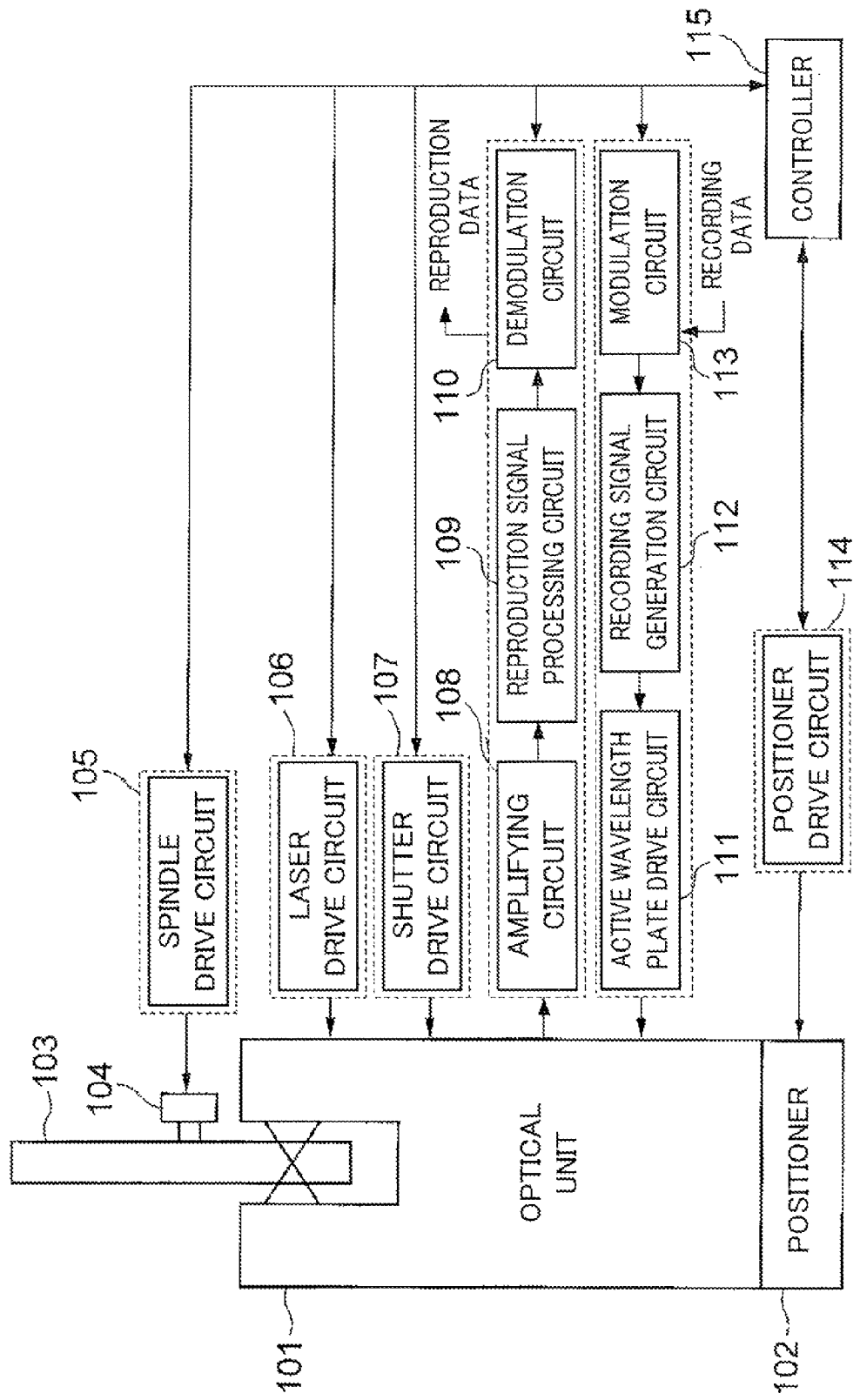
FIG. 7 A block diagram showing an optical information recording/reproducing device using a recording medium having a first entrance face and a second entrance face.

An optical information recording/reproducing device including the optical unit shown in FIG. 1 will be described. FIG. 7 shows an optical information recording/reproducing device. The optical information recording/reproducing device has an optical unit 101, a positioner 102, a spindle 104, a spindle drive circuit 105, a laser drive circuit 106, a shutter drive circuit 107, an amplifying circuit 108, a reproduction signal processing circuit 109, a demodulation circuit 110, an active wavelength plate drive circuit 111, a recording signal generation circuit 112, a modulation circuit 113, a positioner driver circuit 114, and a controller 115. The optical unit 101a shown in FIG. 1 is used as the optical unit 101. The controller 115 controls the parts of the optical information recording/reproducing device.

The optical unit 101 is mounted on the positioner 102. The recording medium 103 has a disc form and is mounted on the spindle 104. Using a not-shown motor, the positioner drive circuit 114 moves the positioner 102 on which the optical unit 101 is mounted in the radial direction of the recording medium 103 and in the thickness direction of the recording medium 103. The spindle drive circuit 105 rotates the spindle 104 on which the recording medium 103 is mounted using a not-shown motor.

The laser drive circuit 106 drives the laser 116. The laser drive circuit 106 supplies the laser 116 with an electric current so that the light emerging from the laser 116 has a given power upon recording of information on the recording medium 103 and upon reproduction of information from the recording medium 103.

The shutter drive circuit 107 drives the shutter 124 using a not-shown motor. The shutter drive circuit 107 drives the shutter 124 so that the shutter 124 is opened upon recording of information on the recording medium 103 and the shutter 124 is closed upon reproduction of information from the recording medium 103. Here, the shutter drive circuit 107 corresponds to a light irradiation state switching means drive circuit.

The modulation circuit 113 modulates signals supplied from an external source as recording data according to given modulation rules upon recording of information on the recording medium 103. The recording signal generation circuit 112 generates recording signals driving the active wavelength plates 122 and 128 based on the signals modulated by the modulation circuit 113.

The active wavelength plate drive circuit 111 applies no voltage or a voltage V1 to the electrooptical crystal contained in the active wavelength plates 122 and 128 based on recording signals generated by the recording signal generation circuit 112 upon recording of information on the recording medium 103. More specifically, the active wavelength plate drive circuit 111 applies no voltage to the electrooptical crystal when the recording signals are bit data "1" and applies a voltage V1 to the electrooptical crystal when the recording signals are bit data "0." Here, the active wavelength plate drive circuit 111 corresponds to a polarization state switching means drive circuit. Furthermore, the active wavelength plate drive circuit 111 applies no voltage to the electrooptical crystal contained in the active wavelength plate 128 upon reproduction of information from the recording medium 103.

The amplifying circuit 108 amplifies electric signals output from the optical detector 134 upon reproduction of information from the recording medium 103. The reproduction signal processing circuit 109 generates reproduction signals, equalizes the waveforms, and binarizes the signals based on the electric signals amplified by the amplifying circuit 108. The demodulation circuit 110 demodulates the signals binarized by the reproduction signal processing circuit 109 according to given demodulation rules and outputs them to an external device as reproduction data.

Figure 8:
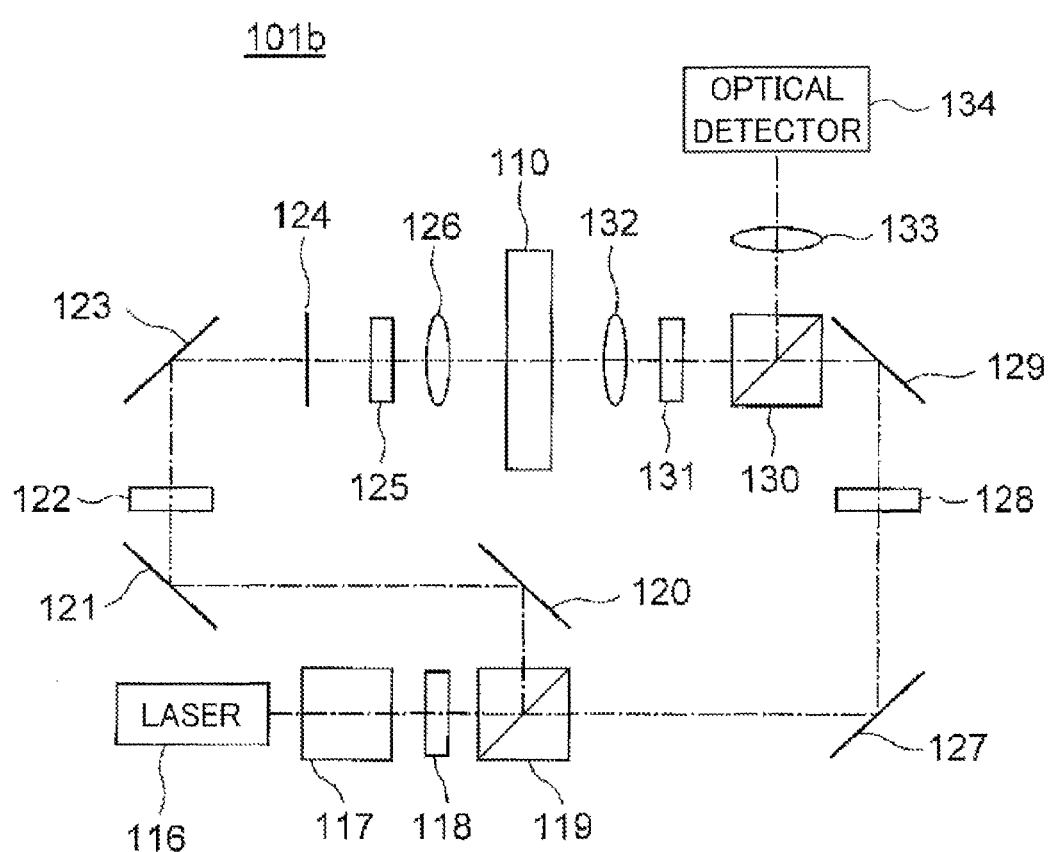
FIG. 8 A block diagram showing an optical unit of Embodiment 2 of the present invention.

Embodiment 2 of the present invention will be described hereafter. FIG. 8 shows an optical unit of Embodiment 2 of the present invention. An optical unit 101b of this embodiment is constructed by adding a beam splitter 130 and λ/4 plates 125 and 131 and positioning the active wavelength plates 122 and 128, convex lens 133, and optical detector 134 differently in the optical unit 101a shown in FIG. 1. The beam splitter 130 transmits approximately 50% and reflects approximately 50% of the incident light regardless of its polarization state.

Light emerging from the laser 116 has the beam diameter enlarged after transmission through the beam expander 117 and becomes a linearly polarized light having a polarization direction of 35° with respect to the sheet surface in a cross-section perpendicular to the optical axis after transmission through the λ/2 plate 118. Approximately 67% of the light is transmitted through the polarized beam splitter 119 as P polarization components and approximately 33% is reflected by the polarized beam splitter 119 as S polarization components. The light transmitted through the polarized beam splitter 119 is referred to as the first light and the light reflected by the polarized beam splitter 119 is referred to as the second light in the explanation below. Incidentally, it will be no problem that the light reflected by the polarized beam splitter 119 is referred to as the first light and the light transmitted through the polarized beam splitter 119 is referred to as the second light.

For recording bit data "1" on the recording medium 103, the first light is reflected by the mirror 127 to enter the active wavelength plate 128. The active wavelength plate 128 is controlled to serve as a λ plate for recording bit data "1" on the recording medium 103. Then, the light entering the active wavelength plate 128 is transmitted through the active wavelength plate 128 without any change in polarization state. The light is reflected by the mirror 129. Approximately 50% of the light is transmitted through the beam splitter 130 and transformed by the λ/4 plate 131 from a linearly polarized light to a clockwise circularly polarized light. The objective lens 132 converges the light in the recording layer of the recording medium 103.

On the other hand, the second light is reflected by the mirrors 120 and 121 to enter the active wavelength plate 122. The active wavelength plate 122 is controlled to serve as λ plate for recording bit data "1" on the recording medium 103. Then, the light entering the active wavelength plate 122 is transmitted through the active wavelength plate 122 without any change in polarization state. The light is reflected by the mirror 123, passes through the shutter 124, and is transformed by the λ/4 plate 125 from a linearly polarized light to a clockwise circularly polarized light. The objective lens 126 converges the light in the recording layer of the recording medium 103.

For recording bit data "0" on the recording medium 103, the first light is reflected by the mirror 127 to enter the active wavelength plate 128. The active wavelength plate 128 is controlled to serve as a λ/2 plate for recording bit data "0" on the recording medium 103. Then, the light entering the active wavelength plate 128 is transmitted through the active wavelength plate 128 with the polarization direction rotated by 90°. The light is reflected by the mirror 129. Approximately 50% of the light is transmitted through the beam splitter 130 and transformed by the λ/4 plate 131 from a linearly polarized light to a counterclockwise circularly polarized light. The objective lens 132 converges the light in the recording layer of the recording medium 103.

On the other hand, the second light is reflected by the mirrors 120 and 121 to enter the active wavelength plate 122. The active wavelength plate 122 is controlled to serve as a λ/2 plate for recording bit data "0" on the recording medium 103. Then, the light entering the active wavelength plate 122 is transmitted through the active wavelength plate 122 with the polarization direction rotated by 90°. The light is reflected by the mirror 123, passes through the shutter 124, and is transformed by the λ/4 plate 125 from a linearly polarized light to a counterclockwise circularly polarized light. The objective lens 126 converges the light in the recording layer of the recording medium 103.

For reproducing information from the recoding medium 103, the first light is reflected by the mirror 127 to enter the active wavelength plate 128. The light entering the active wavelength plate 128 is transmitted through the active wavelength plate 128 without any change in polarization state. The light is reflected by the mirror 129. Approximately 50% of the light is transmitted through the beam splitter 130 and transformed by the λ/4 plate 131 from a linearly polarized light to a clockwise circularly polarized light. The objective lens 132 converges the light in the recording layer of the recording medium 103. Here, blocked by the shutter 124, the second light does not head for the recording medium 103.

When bit data "1" are recorded at the convergence point, the light having converged in the recording layer of the recording medium 103 is partly reflected at the convergence point as a clockwise circularly polarized light, passes through the objective lens 132 in the reverse direction, and is transmitted through the λ/4 plate 131, whereby it is transformed from a clockwise circularly polarized light to a linearly polarized light having the same polarization direction as the outgoing light. Approximately 50% of the linearly polarized light is reflected by the beam splitter 130. The convex lens 133 converges the light on the light reception part of the optical detector 134. With light being received at the light reception part of the optical detector 134, it is determined that the information recorded at the convergence point is bit data "1." On the other hand, when bit data "0" are recorded at the convergence point, the light having converged in the recording layer of the recording medium 103 is not reflected at the convergence point. With no light being received at the light reception part of the optical detector 134, it is determined that the information recorded at the convergence point is bit data "0."

In the above description, the active wavelength plate 128 serves as a λ plate for reproducing information from the recording medium 103. The active wavelength plate 128 can serve as a λ/2 plate. In such a case, the light reception part of the optical detector 134 receives no light when bit data "1" are recorded at the convergence point. Conversely, the light reception part of the optical detector 134 receives light when bit data "0" are recorded at the convergence point.

The active wavelength plates 122 and 128 have the same structure as explained in Embodiment 1. Here, it is assumed that the length of the electrooptical crystal in the optical axis direction of the incident light is T, the wavelength of the incident light is λ, and the difference in refractive index between the polarization components parallel to the optical axis and the polarization components perpendicular to the optical axis changes from Δn0 to Δn1 as a voltage is applied. T is so determined as to satisfy Δn0T=mλ (m is an integer). It is assumed that a voltage V1 leads to Δn1T=mλ+(λ/2). Here, the active wavelength plates 122 and 128 serve as a λ plate when no voltage is applied and serve as a λ/2 plate when the voltage V1 is applied. Assuming that the polarization direction of the incident light is at 45° with respect to the optical axis, the active wavelength plates 122 and 128 do not change the polarization state of the transmitted light when no voltage is applied and rotate the polarization direction of the transmitted light by 90° when the voltage V1 is applied.

Figure 9:
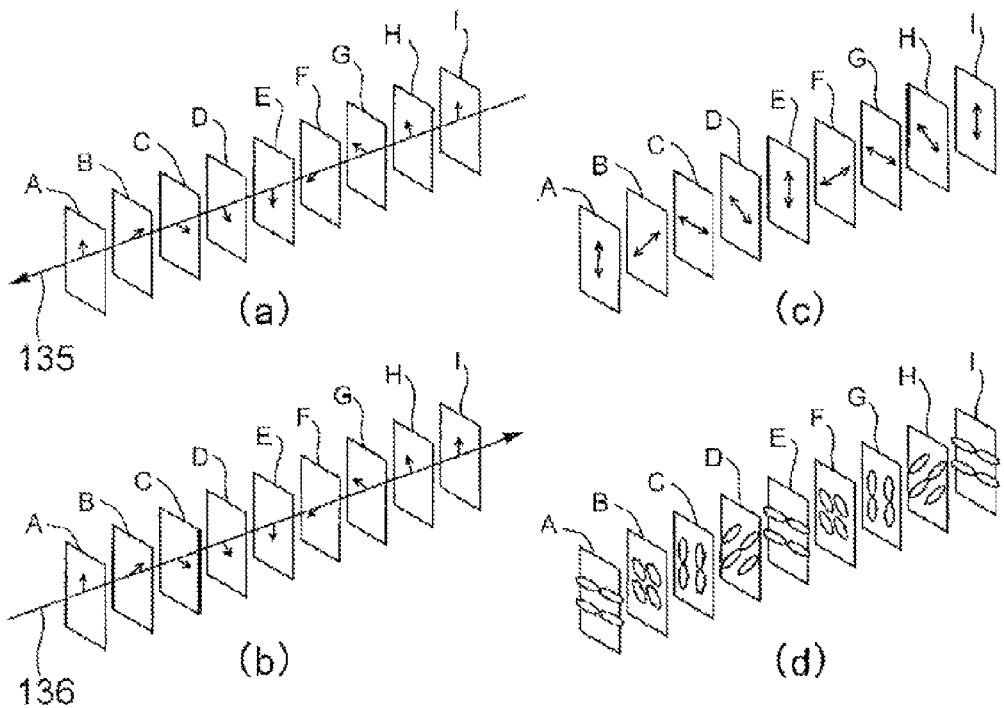
FIG. 9 (a) to (d) are illustrations showing mechanism of recording bit data "1" with the use of circularly polarized light.

Recording of information on the recording medium 103 will be described. FIGS. 9 (a) to 9 (d) show mechanism of recording bit data "1." In FIGS. 9 (a) to 9 (d), cross-sections A to I are cross-sections perpendicular to the optical axis at positions dividing the length of one wavelength into eight equal sections along the optical axis of the beams 135 and 136 that are recording lights.

FIG. 9 (a) shows the electric field vectors of the beam 135 near the convergence point in the recording layer 138 at a time t. Based on the phase of the beam 135 in the cross-section A, the phase in a cross-section A is 0, the phase in a cross-section B is π/4, the phase in a cross-section C is π/2, the phase in a cross-section D is 3π/4, the phase in a cross-section E is π, the phase in a cross-section F is 5π/4, the phase in a cross-section G is 3π/2, the phase in a cross-section H is 7π/4, and the phase in a cross-section I is 2π. The electric field vectors rotate clockwise seen in the direction opposite to the travelling direction of the beam 135 from the cross-section A to the cross-section I.

FIG. 9 (b) shows the electric field vectors of the beam 136 near the convergence point in the recording layer 138 at a time t. Based on the phase of the beam 136 in the cross-section I, the phase in a cross-section A is 2π, the phase in a cross-section B is 7π/4, the phase in a cross-section C is 3π/2, the phase in a cross-section D is 5π/4, the phase in a cross-section E is π, the phase in a cross-section F is 3π/4, the phase in a cross-section G is π/2, the phase in a cross-section H is π/4, and the phase in a cross-section I is 0. The electric field vectors rotate clockwise seen in the direction opposite to the travelling direction of the beam 136 from the cross-section I to the cross-section A.

FIG. 9 (c) shows the polarization profile of the composite light of the beams 135 and 136 near the convergence point in the recording layer 138. The electric field vectors of the beam 135 shown in FIG. 9 (a) and the electric field vectors of the beam 136 shown in FIG. 9 (b) change in direction with the time in the cross-sections A to I. On the other hand, the electric field vectors of the composite light of the two change in magnitude with the time. In other words, the composite light of the beams 135 and 136 is a linearly polarized light in the cross-sections A to I. Its polarization direction rotates clockwise seen in the direction opposite to the travelling direction of the beam 135 from the cross-section A to the cross-section I.

FIG. 9 (d) shows the orientation profile of azobenzene molecules oriented in association with the composite light of the beams 135 and 136 near the convergence point in the recording layer 138. The azobenzene molecules are oriented in the direction perpendicular to the polarization direction under a linearly polarized light. Therefore, their orientation rotates clockwise seen in the direction opposite to the travelling direction of the beam 135 from the cross-section A to the cross-section I.

Figure 10:
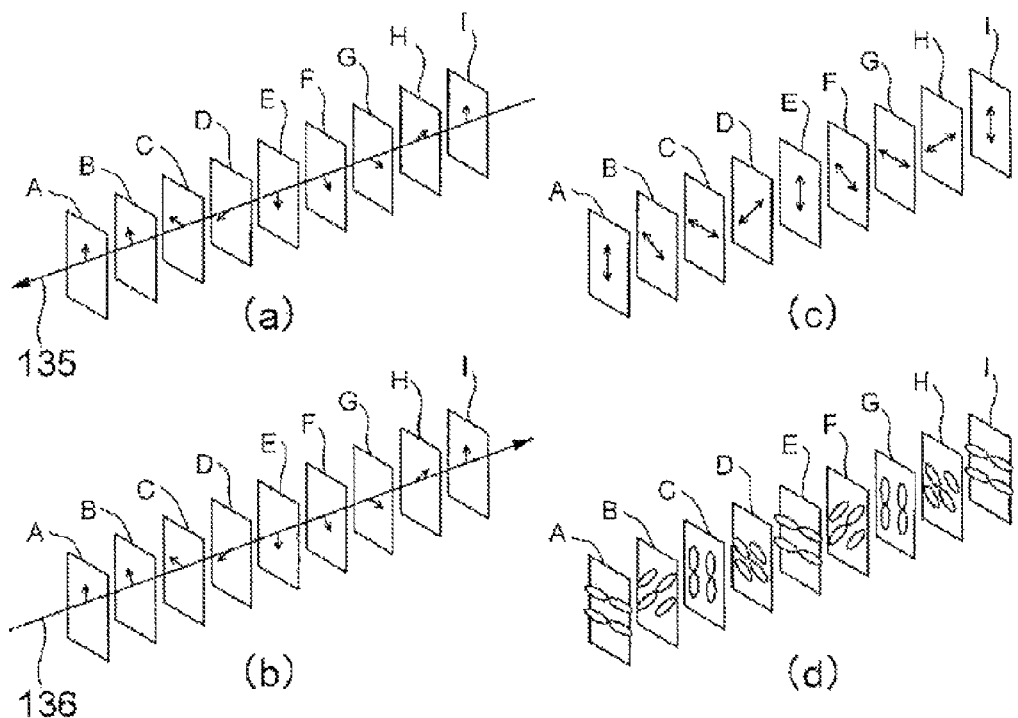
FIG. 10 (a) to (d) are illustrations showing mechanism of recording bit data "0" with the use of circularly polarized light.

FIGS. 10 (a) to 10 (d) show mechanism of recording bit data "0." In FIGS. 10 (a) to 10 (d), cross-sections A to I are cross-sections perpendicular to the optical axis at positions dividing the length of one wavelength into eight equal sections along the optical axis of the beams 135 and 136.

FIG. 10 (a) shows the electric field vectors of the beam 135 near the convergence point in the recording layer 138 at a time t. Based on the phase of the beam 135 in the cross-section A, the phase in a cross-section A is 0, the phase in a cross-section B is π/4, the phase in a cross-section C is π/2, the phase in a cross-section D is 3π/4, the phase in a cross-section E is π, the phase in a cross-section F is 5π/4, the phase in a cross-section G is 3π/2, the phase in a cross-section H is 7π/4, and the phase in a cross-section I is 2π. The electric field vectors rotate counterclockwise seen in the direction opposite to the travelling direction of the beam 135 from the cross-section A to the cross-section I.

FIG. 10 (b) shows the electric field vectors of the beam 136 near the convergence point in the recording layer 138 at a time t. Based on the phase of the beam 136 in the cross-section I, the phase in a cross-section A is 2π, the phase in a cross-section B is 7π/4, the phase in a cross-section C is 3π/2, the phase in a cross-section D is 5π/4, the phase in a cross-section E is π, the phase in a cross-section F is 3π/4, the phase in a cross-section G is π/2, the phase in a cross-section H is π/4, and the phase in a cross-section I is 0. The electric field vectors rotate counterclockwise seen in the direction opposite to the travelling direction of the beam 136 from the cross-section I to the cross-section A.

FIG. 10 (c) shows the polarization profile of the composite light of the beams 135 and 136 near the convergence point in the recording layer 138. The electric field vectors of the beam 135 shown in FIG. 10 (a) and the electric field vectors of the beam 136 shown in FIG. 10 (b) change in direction with the time in the cross-sections A to I. On the other hand, the electric field vectors of the composite light of the two change in magnitude with the time. In other words, the composite light of the beams 135 and 136 is a linearly polarized light in the cross-sections A to I. Its polarization direction rotates counterclockwise seen in the direction opposite to the travelling direction of the beam 135 from the cross-section A to the cross-section I.

FIG. 10 (d) shows the orientation profile of azobenzene molecules oriented in association with the composite light of the beams 135 and 136 near the convergence point in the recording layer 138. The azobenzene molecules are oriented in the direction perpendicular to the polarization direction under a linearly polarized light. Therefore, their orientation rotates counterclockwise seen in the direction opposite to the travelling direction of the beam 135 from the cross-section A to the cross-section I.

The azobenzene molecular orientation profile shown in FIG. 9 (d) is recorded in the parts corresponding to bit data "1" and the azobenzene molecular orientation profile shown in FIG. 10 (d) is recorded in the parts corresponding to bit data "0" in the recording layer 138. When bit data "1" are recorded in the parts where bit data "1" have been recorded, the azobenzene molecular orientation profile remains in the state shown in FIG. 9 (d). When bit data "0" are recorded in the parts where bit data "1" have been recorded, the azobenzene molecular orientation profile changes from the state shown in FIG. 9 (d) to the state shown in FIG. 10 (d).

On the other hand, when bit data "0" are recorded in the parts where bit data "0" have been recorded, the azobenzene molecular orientation profile remains in the state shown in FIG. 10 (d). When bit data "1" are recorded in the parts where bit data "0" have been recorded, the azobenzene molecular orientation profile changes from the state shown in FIG. 10 (d) to the state shown in FIG. 9 (d). In other words, there is no need of deleting the azobenzene molecular orientation profile prior to recording for recording bit data "0" or "1" in the parts where bit data "1" or "0" have been recorded.

Figure 11:
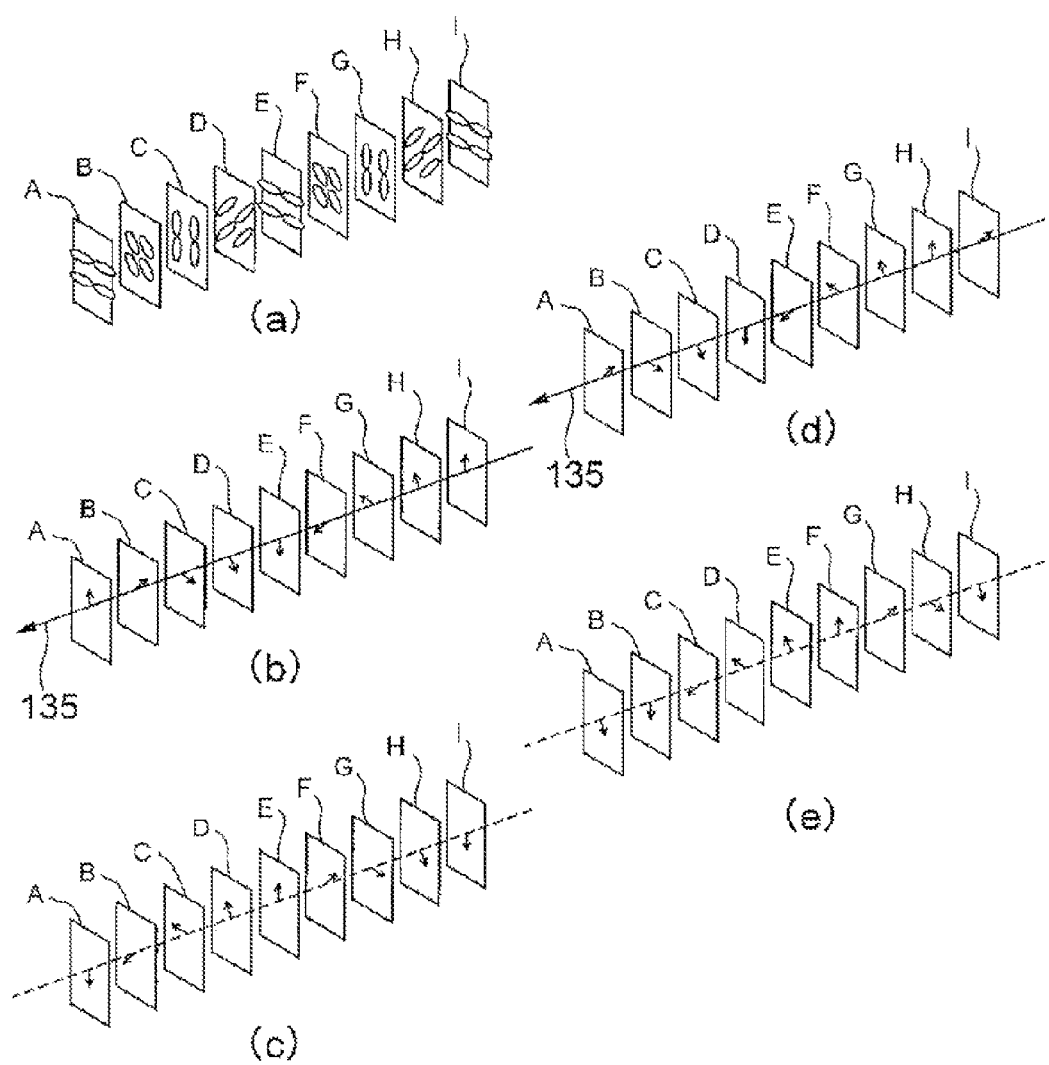
FIG. 11 (a) to (e) are illustrations showing mechanism of reproducing bit data "1" with the use of circularly polarized light.

Reproduction of information from the recording medium 103 will be described hereafter. FIGS. 11 (a) to 11 (e) show mechanism of reproducing bit data "1." In FIGS. 11 (a) to 11 (e), cross-sections A to I are cross-sections perpendicular to the optical axis at positions dividing the length of one wavelength into eight equal sections along the optical axis of the beam 135 that is reproducing light. FIG. 11 (a) is the same as FIG. 9 (d), showing the azobenzene molecular orientation profile recorded in the parts corresponding to bit data "1" near the convergence point in the recording layer 138.

FIG. 11 (b) shows the electric field vectors of the beam 135 near the convergence point in the recording layer 138 at a time t. FIG. 11 (c) shows the electric field vectors of light occurring at the positions in the cross-sections A to I at the time t. The light having the electric field vectors shown in FIG. 11 (b) interacts with the azobenzene molecules having the orientation profile shown in FIG. 11 (a), whereby other light occurs at the positions in the cross-sections A to I. Here, the electric field vectors of light occurring at the positions in the cross-sections A to I result from folding the electric field vectors of the original light in a line-symmetric manner about the azobenzene molecular orientation.

FIG. 11 (d) shows the electric field vectors of the beam 135 near the convergence point in the recording layer 138 at a time (t+Δt) when the beam 135 has advanced ⅛ wavelength since the time t. FIG. 11 (e) shows the electric field vectors of light occurring at the positions in the cross-sections A to I near the convergence point in the recording layer 138 at the time (t+Δt). The light having the electric field vectors shown in FIG. 11 (d) interacts with the azobenzene molecules having the orientation profile shown in FIG. 11 (a), whereby other light occurs at the positions in the cross-sections A to I. Here, the electric field vectors of light occurring at the positions in the cross-sections A to I result from folding the electric field vectors of the original light in a line-symmetric manner about the azobenzene molecular orientation.

It is understood from FIGS. 11 (c) and 11 (e) that the light occurring at the positions in the cross-sections A to I is a clockwise circularly polarized light travelling in the opposite direction to the beam 135. In other words, it is understood that when the beam 135 that is a clockwise circularly polarized light converges in the parts corresponding to bit data "1" in the recording layer 138, it is partly reflected as a clockwise circularly polarized light.

Figure 12:
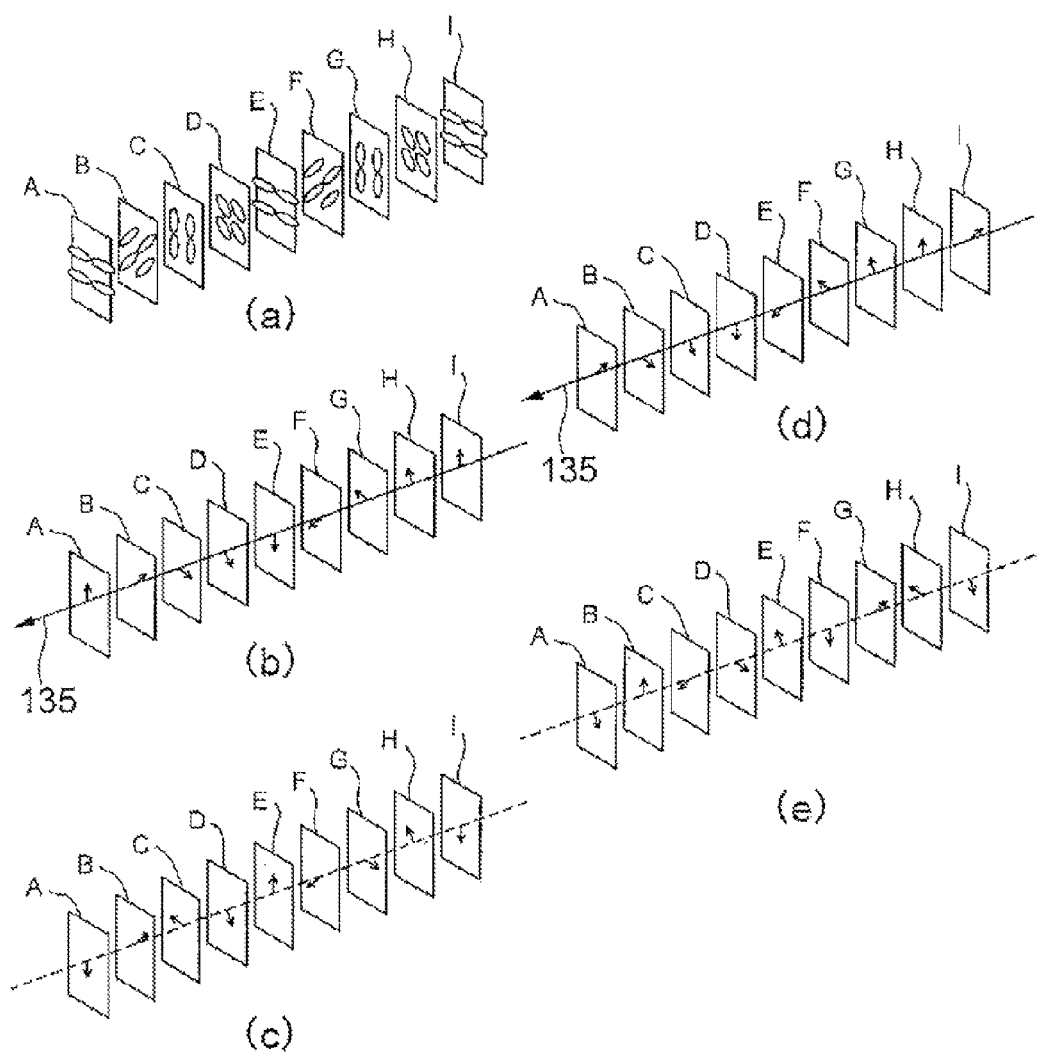
FIG. 12 (a) to (e) are illustrations showing mechanism of reproducing bit data "0" with the use of circularly polarized light.

FIGS. 12 (a) to 12 (e) show mechanism of reproducing bit data "0." In FIGS. 12 (a) to 12 (e), cross-sections A to I are cross-sections perpendicular to the optical axis at positions dividing the length of one wavelength into eight equal sections along the optical axis of the beam 135. FIG. 12 (a) is the same as FIG. 10 (d), showing the azobenzene molecular orientation profile recorded in the parts corresponding to bit data "0" near the convergence point in the recording layer 138.

FIG. 12 (b) shows the electric field vectors of the beam 135 near the convergence point in the recording layer 138 at a time t. FIG. 12 (c) shows the electric field vectors of light occurring at the positions in the cross-sections A to I at the time t. The light having the electric field vectors shown in FIG. 12 (b) interacts with the azobenzene molecules having the orientation profile shown in FIG. 12 (a), whereby other light occurs at the positions in the cross-sections A to I. Here, the electric field vectors of light occurring at the positions in the cross-sections A to I result from folding the electric field vectors of the original light in a line-symmetric manner about the azobenzene molecular orientation.

FIG. 12 (d) shows the electric field vectors of the beam 135 near the convergence point in the recording layer 138 at a time (t+Δt) when the beam 135 has advanced ⅛ wavelength since the time t. FIG. 12 (e) shows the electric field vectors of light occurring at the positions in the cross-sections A to I near the convergence point in the recording layer 138 at the time (t+Δt). The light having the electric field vectors shown in FIG. 12 (d) interacts with the azobenzene molecules having the orientation profile shown in FIG. 12 (a), whereby other light occurs at the positions in the cross-sections A to I. Here, the electric field vectors of light occurring at the positions in the cross-sections A to I result from folding the electric field vectors of the original light in a line-symmetric manner about the azobenzene molecular orientation.

It is understood from FIGS. 12 (c) and 12 (e) that the light occurring at the positions in the cross-sections A to I is not a light having a specific polarization state and travelling in a specific direction. In other words, it is understood that when the beam 135 that is a clockwise circularly polarized light converges in the parts corresponding to bit data "0" in the recording layer 138, the light is not reflected.

An optical information recording/reproducing device including the optical unit shown in FIG. 8 will be described. The optical information recording/reproducing device is the same as the one shown in FIG. 7. The optical unit 101a shown in FIG. 8 is used as the optical unit 101.

The active wavelength plate drive circuit 111 applies no voltage or a voltage V1 to the electrooptical crystal contained in the active wavelength plates 122 and 128 based on recording signals generated by the recording signal generation circuit 112 upon recording of information on the recording medium 103. More specifically, the active wavelength plate drive circuit 111 applies no voltage to the electrooptical crystal when the recording signals are bit data "1" and applies a voltage V1 to the electrooptical crystal when the recording signals are bit data "0." Furthermore, the active wavelength plate drive circuit 111 applies no voltage to the electrooptical crystal contained in the active wavelength plate 128 upon reproduction of information from the recording medium 103.

Figure 13:
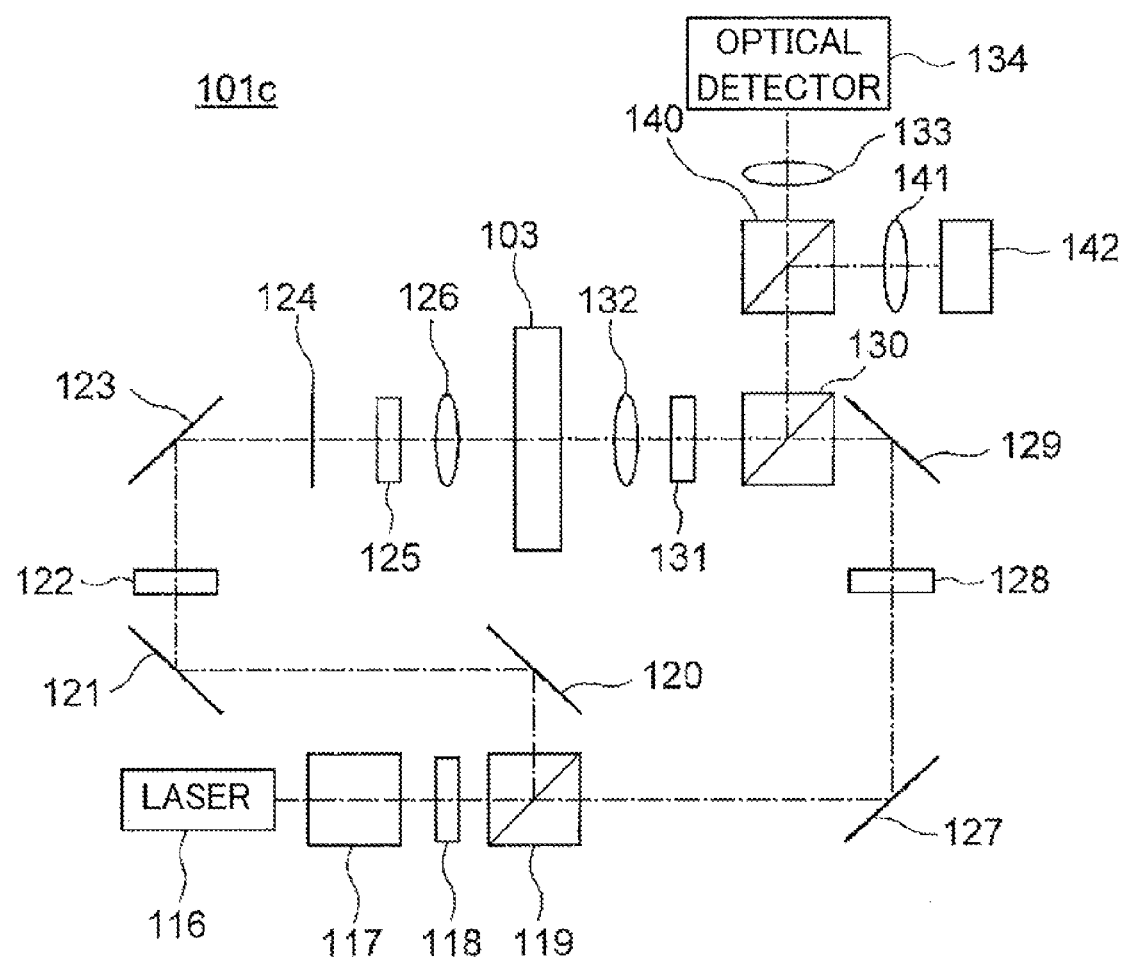
FIG. 13 A block diagram showing an optical unit of Embodiment 3 of the present invention.

Embodiment 3 of the present invention will be described. FIG. 13 shows an optical unit of Embodiment 3 of the present invention. An optical unit 101c of this embodiment is constructed by adding a polarized beam splitter 140, a convex lens 141, and a detector 142 to the optical unit 101b shown in FIG. 8. The polarized beam splitter 140 transmits almost 100% of P polarization components and reflects almost 100% of S polarization components of the incident light. Here, the polarized beam splitter 140 corresponds to a polarized light separation means.

The active wavelength plate 128 can be switched between serving as a λ plate and serving as a λ/2 plate for the incident light. The active wavelength plate 128 is controlled to serve as a λ/4 plate for the incident light upon reproduction of information from the recording medium 103. The detector 142 outputs electric signals according to the amount of light entering the light reception part as the optical detector 134 does. Here, the detector 142 corresponds to an optical detector as the optical detector 134. The convex lens 141 converges the incident light on the light reception part of the detector 142.

The optical unit 101c operates the same way as the optical unit 101b upon recording of information on the recording medium 103. For reproducing information from the recoding medium 103, the first light is reflected by the mirror 127 to enter the active wavelength plate 128. The light entering the active wavelength plate 128 is transformed from a linearly polarized light to a clockwise circularly polarized light while it is transmitted through the active wavelength plate 128. The light is reflected by the mirror 129. Approximately 50% of the light is transmitted through the beam splitter 130 and transformed by the λ/4 plate 131 from a clockwise circularly polarized light to a linearly polarized light. The objective lens 132 converges the light in the recording layer of the recording medium 103. The light includes both clockwise circular polarization components and counterclockwise circular polarization components. Here, blocked by the shutter 124, the second light does not head for the recording medium 103.

When bit data "1" are recorded at the convergence point, the clockwise circular polarization components of the light having converged in the recording layer of the recording medium 103 are partly reflected at the convergence point as a clockwise circularly polarized light while the counterclockwise circular polarization components are not reflected at the convergence point. The light reflected at the convergence point passes through the objective lens 132 in the reverse direction and is transmitted through the λ/4 plate 131, whereby it is transformed from a clockwise circularly polarized light to a linearly polarized light. Approximately 50% of the light is reflected by the beam splitter 130 to enter the polarized beam splitter 140 as P polarization and almost 100% of the light is transmitted through it. The convex lens 133 converges the light on the light reception part of the optical detector 134. With light being received at the light reception part of the optical detector 134 and no light being received at the light reception part of the detector 142, it is determined that the information recorded at the convergence point is bit data "1."

When bit data "0" are recorded at the convergence point, the counterclockwise circular polarization components of the light having converged in the recording layer of the recording medium 103 are partly reflected at the convergence point as a counterclockwise circularly polarized light while the clockwise circular polarization components are not reflected at the convergence point. The light reflected at the convergence point passes through the objective lens 132 in the reverse direction and is transmitted through the λ/4 plate 131, whereby it is transformed from a counterclockwise circularly polarized light to a linearly polarized light. Approximately 50% of the light is reflected by the beam splitter 130 to enter the polarized beam splitter 140 as S polarization and almost 100% of the light is reflected by it. The convex lens 141 converges the light on the light reception part of the detector 142. With light being received at the light reception part of the detector 142 and no light being received at the light reception part of the optical detector 134, it is determined that the information recorded at the convergence point is bit data "0."

Here, if reproduction signals are created by subtracting electric signals output from the detector 142 from electric signals output from the optical detector 134, the reproduction signals have a "positive" or "negative" sign when bit data "1" or bit data "0" are recorded at the convergence point, respectively. In other words, the bit data can be known from the sign of reproduction signals. If the light emerging from the laser 116 fluctuates in power upon reproduction of information from the recording medium 103, some noise due to fluctuation in power is superimposed on the electric signals output from the optical detector 134 and the electric signals output from the detector 142. However, using the difference between them cancels the noise; reproduction signals having a high signal/noise ratio can be obtained.

The active wavelength plate 128 has the same structure as explained in Embodiment 2. Here, it is assumed that the length of the electrooptical crystal in the optical axis direction of the incident light is T, the wavelength of the incident light is λ, and the difference in refractive index between the polarization components parallel to the optical axis and the polarization components perpendicular to the optical axis changes from $\Delta n0$ to $\Delta n1$ as a voltage is applied. T is so determined as to satisfy $\Delta n0 T = m\lambda$ (m is an integer). It is assumed that a voltage V1 leads to $\Delta n1 T = m\lambda + (\lambda/2)$ and a voltage V2 leads to $\Delta n1 T = m\lambda + (\lambda/4)$. Here, the active wavelength plate 128 serves as a λ plate when no voltage is applied, serves as a λ/2 plate when the voltage V1 is applied, and serves as λ/4 plate when the voltage V2 is applied. Assuming that the polarization direction of the incident light is at 45° with respect to the optical axis, the active wavelength plate 128 does not change the polarization state of the transmitted light when no voltage is applied, rotates the polarization direction of the transmitted light by 90° when the voltage V1 is applied, and transforms the transmitted light from a linearly polarized light to a clockwise circularly polarized light when the voltage V2 is applied.

An optical information recording/reproducing device including the optical unit shown in FIG. 13 will be described. The optical information recording/reproducing device is the same as the one shown in FIG. 7. The optical unit 101c shown in FIG. 13 is used as the optical unit 101. The active wavelength plate drive circuit 111 applies the voltage V2 to the electrooptical crystal contained in the active wavelength plate 128 upon reproduction of information from the recording medium 103. The amplifying circuit 108 performs differential amplification on electric signals output from the optical detectors 134 and 142 upon reproduction of information from the recording medium 103.

Figure 14:
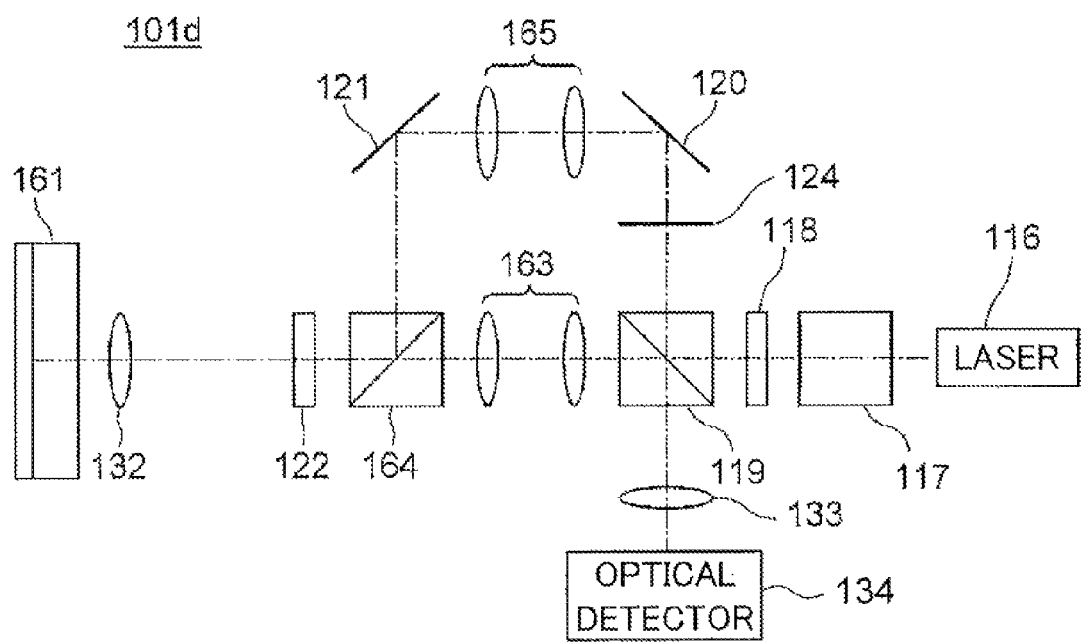
FIG. 14 A block diagram showing an optical unit of Embodiment 4 of the present invention.

Embodiment 4 of the present invention will be described. FIG. 14 shows an optical unit of Embodiment 4 of the present invention. An optical unit 101d of this embodiment has a laser 116, a beam expander 117, a λ/2 plate 118, a polarized beam splitter 119, relay lenses 163 and 165, a beam splitter 164, a shutter 124, mirrors 120 and 121, an active wavelength plate 122, an objective lens 132, a convex lens 133, and an optical detector 134. A recording medium 161 has a recording layer in which the polarization state of light can be recorded and a reflective layer.

The active wavelength plate 122 can be switched between serving as a λ plate and serving as a λ/2 plate for the incident light. The active wavelength plate 122 is controlled to serve as a λ plate or as a λ/2 plate for the incident light according to recording data upon recording of information on the recording medium 161. The active wavelength plate 122 is controlled to serve as a λ plate for the incident light upon reproduction of information from the recording medium 161.

The relay lenses 163 and 165 can change the degree of parallelism of the transmitted light. The beam splitter 164 transmits approximately 50% and reflects approximately 50% of the incident light regardless of its polarization state.

Light emerging from the laser 116 has the beam diameter enlarged after transmission through the beam expander 117 and becomes a linearly polarized light having a polarization direction of 45° with respect to the sheet surface in a cross-section perpendicular to the optical axis after transmission through the λ/2 plate 118. Approximately 50% of the light is transmitted through the polarized beam splitter 119 as P polarization components and approximately 50% is reflected by the polarized beam splitter 119 as S polarization components. The light transmitted through the polarized beam splitter 119 is referred to as the first light and the light reflected by the polarized beam splitter 119 is referred to as the second light in the explanation below. Incidentally, it will be no problem that the light reflected by the polarized beam splitter 119 is referred to as the first light and the light transmitted through the polarized beam splitter 119 is referred to as the second light.

For recording bit data "1" on the recording medium 161, the first light becomes a slightly converging light after transmission through the relay lens 163. Approximately 50% of the light is transmitted through the beam splitter 164 to enter the active wavelength plate 122. The active wavelength plate 122 is controlled to serve as a λ plate for recording bit data "1" on the recording medium 161. Then, the light entering the active wavelength plate 122 is transmitted through the active wavelength plate 122 without any change in polarization state. The objective lens 132 converges the light on the way to the reflective layer in the recording layer of the recording medium 161. The polarization state of the first light at the convergence point in the recording layer in this event corresponds to a first linear polarization.

On the other hand, the second light passes through the shutter 124, is reflected by the mirror 120, and becomes a slightly diverging light after transmission through the relay lens 165. The light is reflected by the mirror 121 and approximately 50% of the light is reflected by the beam splitter 164 to enter the active wavelength plate 122. The light entering the active wavelength plate 122 is transmitted through the active wavelength plate 122 without any change in polarization state. The objective lens 132 helps the light to be transmitted through the recording layer, reflected by the reflective layer, and converge on the way back from the reflective layer in the recording layer of the recording medium 161. The polarization state of the second light at the convergence point in the recording layer in this event corresponds to a second linear polarization.

For recording bit data "0" on the recording medium 161, the first light becomes a slightly converging light after transmission through the relay lens 163. Approximately 50% of the light is transmitted through the beam splitter 164 to enter the active wavelength plate 122. The active wavelength plate 122 is controlled to serve as a λ/2 plate for recording bit data "0" on the recording medium 161. Then, the light entering the active wavelength plate 122 is transmitted through the active wavelength plate 122 with the polarization direction rotated by 45°. The objective lens 132 converges the light on the way to the reflective layer in the recording layer of the recording medium 161. The polarization state of the first light at the convergence point in the recording layer in this event corresponds to a third linear polarization.

On the other hand, the second light passes through the shutter 124, is reflected by the mirror 120, and becomes a slightly diverging light after transmission through the relay lens 165. The light is reflected by the mirror 121 and approximately 50% of the light is reflected by the beam splitter 164 to enter the active wavelength plate 122. The light entering the active wavelength plate 122 is transmitted through the active wavelength plate 122 with the polarization direction rotated by 45°. The objective lens 132 helps the light to be transmitted through the recording layer, reflected by the reflective layer, and converge on the way back from the reflective layer in the recording layer of the recording medium 161. The polarization state of the second light at the convergence point in the recording layer in this event corresponds to a fourth linear polarization.

For reproducing information from the recording medium 161, the first light becomes a slightly converging light after transmission through the relay lens 163. Approximately 50% of the light is transmitted through the beam splitter 164 to enter the active wavelength plate 122. The light entering the active wavelength plate 122 is transmitted through the active wavelength plate 122 without any change in polarization state. The objective lens 132 converges the light on the way to the reflective layer in the recording layer of the recording medium 161. Blocked by the shutter 124, the second light does not head for the recording medium 161.

When bit data "1" are recorded at the convergence point, the light having converged in the recording layer of the recording medium 161 is partly reflected at the convergence point as a linearly polarized light having a polarization direction perpendicular to that of the outgoing light, passes through the objective lens 132 in the reverse direction, is transmitted through the active wavelength plate 122 without any change in polarization state, and becomes a collimated light after transmission through the relay lens 163. Almost 100% of the light is reflected by the polarized beam splitter 119. The convex lens 133 converges the light on the light reception part of the optical detector 134. With light being received at the light reception part of the optical detector 134, it is determined that the information recorded at the convergence point is bit data "1."

On the other hand, when bit data "0" are recorded at the convergence point, the light having converged in the recording layer of the recording medium 161 is partly reflected as a linearly polarized light having the same polarization direction as the outgoing light. Almost 100% of the reflected light is transmitted through the polarized beam splitter 119, not heading for the optical detector 134. With no light being received at the light reception part of the optical detector 134, it is determined that the information recorded at the convergence point is bit data "0."

In the above description, the active wavelength plate 122 serves as a λ plate for reproducing information from the recording medium 161. The active wavelength plate 122 can serve as a λ/2 plate. In such a case, the light reception part of the optical detector 134 receives no light when bit data "1" are recorded at the convergence point. Conversely, the light reception part of the optical detector 134 receives light when bit data "0" are recorded at the convergence point.

Figure 15:
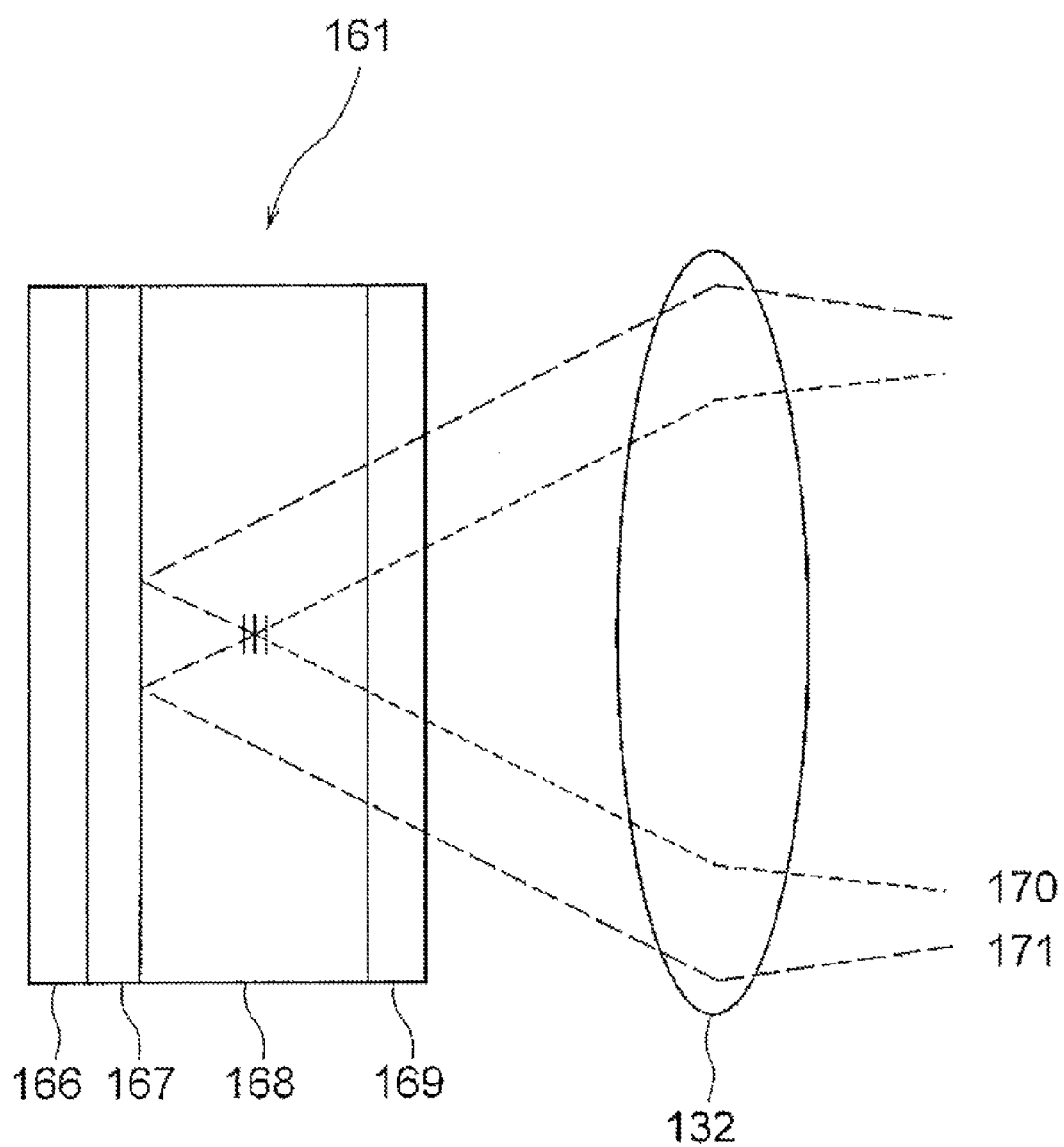
FIG. 15 An illustration showing a recording medium having an entrance face and a reflective layer.

FIG. 15 shows the recording medium 161. The recording medium 161 consists of a recording layer 168 and reflective layer 167 interposed between substrates 169 and 166. The recording layer 168 is made of azobenzene. The polarization state of light can be recorded in the recording layer 168. Beams 170 and 171 are the first and second lights, respectively. The beam 170 enters the recording layer 168 from the substrate 169 and converges on the way to the reflective layer 167 in the recording layer 168. The beam 171 enters the recording layer 168 from the substrate 169, is transmitted through the recording layer 168, reflected by the reflective layer 167, and converges on the way back from the reflective layer 167 in the recording layer 168. Here, the substrate 169 corresponds to an entrance face. The recording medium 161 corresponds to an optical recording medium having an entrance face and a reflective layer.

The mechanism of recording information on the recording medium 161 and the mechanism of reproducing information from the recording medium 161 are the same as explained in Embodiment 1.

Figure 16:
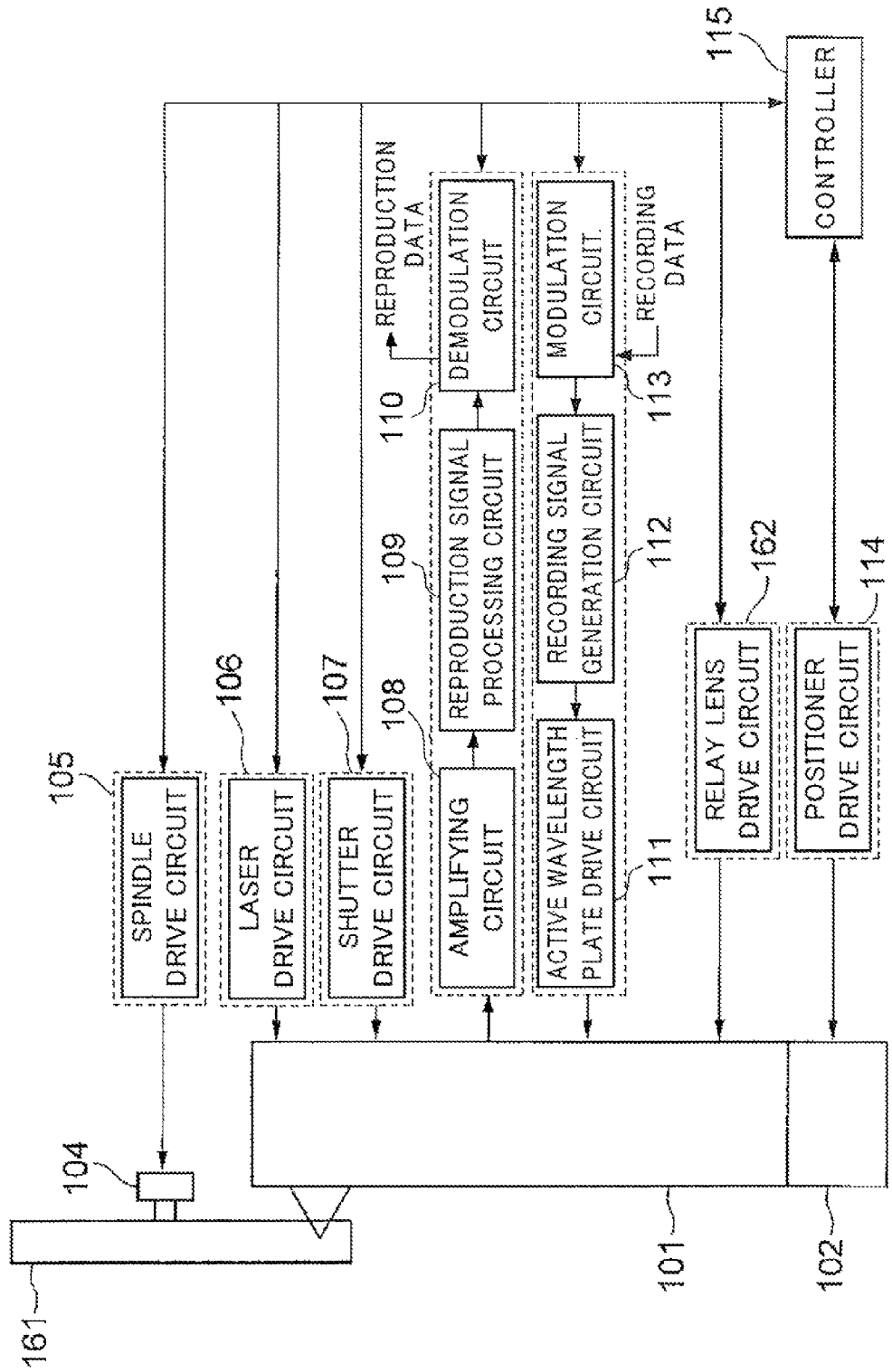
FIG. 16 A block diagram showing an optical information recording/reproducing device using a recording medium having an entrance face and a reflective layer.

An optical information recording/reproducing device including the optical unit shown in FIG. 14 will be described. FIG. 16 shows an optical information recording/reproducing device. The optical information recording/reproducing device has an optical unit 101, a positioner 102, a spindle 104, a spindle drive circuit 105, a laser drive circuit 106, a shutter drive circuit 107, an amplifying circuit 108, a reproduction signal processing circuit 109, a demodulation circuit 110, an active wavelength plate drive circuit 111, a recording signal generation circuit 112, a modulation circuit 113, a positioner driver circuit 114, a relay lens drive circuit 162, and a controller 115. The optical unit 101d shown in FIG. 14 is used as the optical unit 101. The controller 115 controls the parts of the optical information recording/reproducing device.

The optical unit 101 is mounted on the positioner 102. The recording medium 161 has a disc form and is mounted on the spindle 104. The positioner drive circuit 114 moves the positioner 102 on which the optical unit 101 is mounted in the radial direction of the recording medium 161 using a not-shown motor. Using a not-shown motor, the spindle drive circuit 105 rotates the spindle 104 on which the recording medium 161 is mounted. Using a not-shown motor, the relay lens drive circuit 162 changes the intervals of the relay lenses 163 and 165 to move the convergence point of the first and second lights in the thickness direction of the recording medium 161 upon recording of information on the recording medium 161. The relay lens drive circuit 162 changes the interval of the relay lens 163 to move the convergence point of the first light in the thickness direction of the recording medium 161 upon reproduction of information from the recording medium 161.

The laser drive circuit 106 drives the laser 116. The laser drive circuit 106 supplies the laser 116 with an electric current so that the light emerging from the laser 116 has a given power upon recording of information on the recording medium 161 and upon reproduction of information from the recording medium 161.

The shutter drive circuit 107 drives the shutter 124 using a not-shown motor. The shutter drive circuit 107 drives the shutter 124 so that the shutter 124 is opened upon recording of information on the recording medium 161 and the shutter 124 is closed upon reproduction of information from the recording medium 161.

The modulation circuit 113 modulates signals supplied from an external source as recording data according to given modulation rules upon recording of information on the recording medium 161. The recording signal generation circuit 112 generates recording signals driving the active wavelength plate 122 based on the signals modulated by the modulation circuit 113. The active wavelength plate drive circuit 111 applies no voltage or a voltage V1 to the electrooptical crystal contained in the active wavelength plate 122 based on recording signals generated by the recording signal generation circuit 112 upon recording of information on the recording medium 161. More specifically, the active wavelength plate drive circuit 111 applies no voltage to the electrooptical crystal when the recording signals are bit data "1" and applies a voltage V1 to the electrooptical crystal when the recording signals are bit data "0." Furthermore, the active wavelength plate drive circuit 111 applies no voltage to the electrooptical crystal contained in the active wavelength plate 122 upon reproduction of information from the recording medium 161.

The amplifying circuit 108 amplifies electric signals output from the optical detector 134 upon reproduction of information from the recording medium 161. The reproduction signal processing circuit 109 generates reproduction signals, equalizes the waveforms, and binarizes the signals based on the electric signals amplified by the amplifying circuit 108. The demodulation circuit 110 demodulates the signals binarized by the reproduction signal processing circuit 109 according to given demodulation rules and outputs them to an external device as reproduction data.

Figure 17:
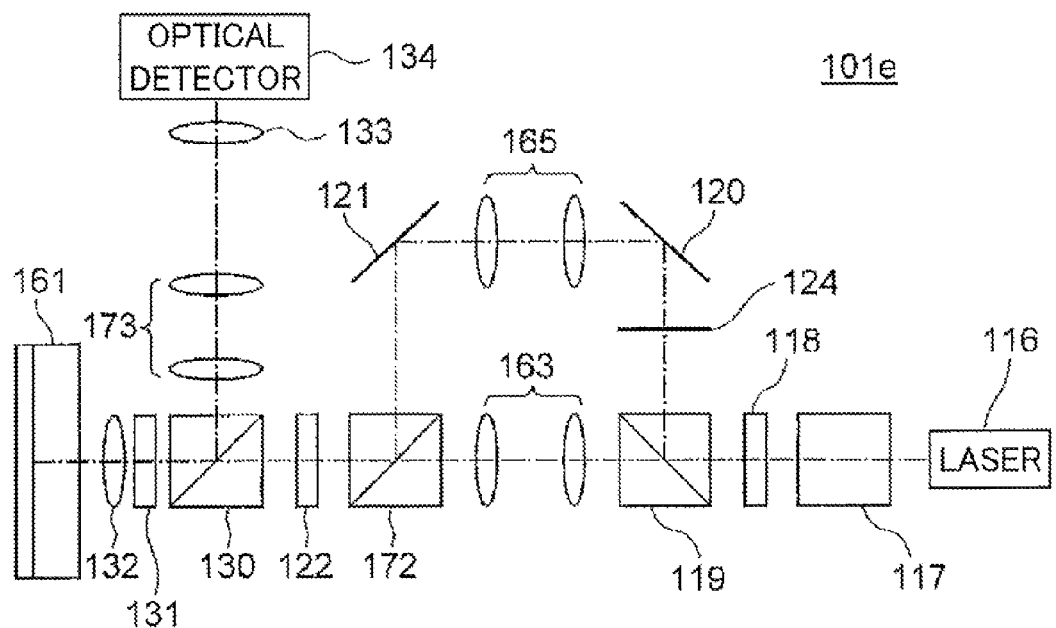
FIG. 17 A block diagram showing an optical unit of Embodiment 5 of the present invention.

Embodiment 5 of the present invention will be described. FIG. 17 shows an optical unit of Embodiment 5 of the present invention. An optical unit 101*e* of this embodiment is constructed by adding a beam splitter 130, a λ/4 plate 131, and a relay lens 173 and replacing the beam splitter 164 with a polarized beam splitter 172 in the optical unit 101*d* shown in FIG. 14. The relay lens 173 can change the degree of parallelism of the transmitted light. The polarized beam splitter 172 transmits almost 100% of P polarization components and reflects almost 100% of S polarization components of the incident light.

Light emerging from the laser 116 has the beam diameter enlarged after transmission through the beam expander 117 and becomes a linearly polarized light having a polarization direction of 45° with respect to the sheet surface in a cross-section perpendicular to the optical axis after transmission through the λ/2 plate 118. Approximately 50% of the light is transmitted through the polarized beam splitter 119 as P polarization components and approximately 50% is reflected by the polarized beam splitter 119 as S polarization components. The light transmitted through the polarized beam splitter 119 is referred to as the first light and the light reflected by the polarized beam splitter 119 is referred to as the second light in the explanation below. Incidentally, it will be no problem that the light reflected by the polarized beam splitter 119 is referred to as the first light and the light transmitted through the polarized beam splitter 119 is referred to as the second light.

For recording bit data "1" on the recording medium 161, the first light becomes a slightly converging light after transmission through the relay lens 163. Entering the polarized beam splitter 172 as P polarization, almost 100% of the light is transmitted through it to enter the active wavelength plate 122. The active wavelength plate 122 is controlled to serve as a λ plate for recording bit data "1" on the recording medium 161. Then, the light entering the active wavelength plate 122 is transmitted through the active wavelength plate 122 without any change in polarization state. Approximately 50% of the light is transmitted through the beam splitter 130 and transformed by the λ/4 plate 131 from a linearly polarized light to a clockwise circularly polarized light. The objective lens 132 converges the light on the way to the reflective layer in the recording layer of the recording medium 161.

On the other hand, the second light passes through the shutter 124, is reflected by the mirror 120, becomes a slightly diverging light after transmission through the relay lens 165, and is reflected by the mirror 121. Entering the polarized beam splitter 172 as S polarization, almost 100% of the light is reflected by it to enter the active wavelength plate 122. The light entering the active wavelength plate 122 is transmitted through the active wavelength plate 122 without any change in polarization state. Approximately 50% of the light is transmitted through the beam splitter 130 and transformed by the λ/4 plate 131 from a linearly polarized light to a counterclockwise circularly polarized light. The objective lens 132 helps the light to be transmitted through the recording layer of the recording medium 161, reflected by the reflective layer so as to be transformed from a counterclockwise circularly polarized light to a clockwise circularly polarized light, and converge on the way back from the reflective layer in the recording layer.

For recording bit data "0" on the recording medium 161, the first light becomes a slightly converging light after transmission through the relay lens 163. Entering the polarized, beam splitter 172 as P polarization, almost 100% of the light is transmitted through it to enter the active wavelength plate 122. The active wavelength plate 122 is controlled to serve as a λ/2 plate for recording bit data "0" on the recording medium 161. Then, the light entering the active wavelength plate 122 is transmitted through the active wavelength plate 122 with the polarization direction rotated by 90°. Approximately 50% of the light is transmitted through the beam splitter 130 and transformed by the λ/4 plate 131 from a linearly polarized light to a counterclockwise circularly polarized light. The objective lens 132 converges the light on the way to the reflective layer in the recording layer of the recording medium 161.

On the other hand, the second light passes through the shutter 124, is reflected by the mirror 120, becomes a slightly diverging light after transmission through the relay lens 165, and is reflected by the mirror 121. Entering the polarized beam splitter 172 as S polarization, almost 100% of the light is reflected by it to enter the active wavelength plate 122. The light entering the active wavelength plate 122 is transmitted through the active wavelength plate 122 with the polarization direction rotated by 90°. Approximately 50% of the light is transmitted through the beam splitter 130 and transformed by the λ/4 plate 131 from a linearly polarized light to a clockwise circularly polarized light. The objective lens 132 helps the light to be transmitted through the recording layer of the recording medium 161, reflected by the reflective layer so as to be transformed from a clockwise circularly polarized light to a counterclockwise circularly polarized light, and converge on the way back from the reflective layer in the recording layer.

For reproducing information from the recording medium 161, the first light becomes a slightly converging light after transmission through the relay lens 163. Entering the polarized beam splitter 172 as P polarization, almost 100% of the light is transmitted through it to enter the active wavelength plate 122. The light entering the active wavelength plate 122 is transmitted through the active wavelength plate 122 without any change in polarization state. Approximately 50% of the light is transmitted through the beam splitter 130 and transformed by the λ/4 plate 131 from a linearly polarized light to a clockwise circularly polarized light. The objective lens 132 converges the light on the way to the reflective layer in the recording layer of the recording medium 161. Blocked by the shutter 124, the second light does not head for the recording medium 161.

When bit data "1" are recorded at the convergence point, the light having converged in the recording layer of the recording medium 161 is partly reflected at the convergence point as a clockwise circularly polarized light, passes through the objective lens 132 in the reverse direction, and is transmitted through the λ/4 plate 131, whereby it is transformed from a clockwise circularly polarized light to a linearly polarized light having the same polarization direction as the outgoing light. Approximately 50% of the linearly polarized light is reflected by the beam splitter 130 and becomes a collimated light after transmission through the relay lens 173. The convex lens 133 converges the light on the light reception part of the optical detector 134. With light being received at the light reception part of the optical detector 134, it is determined that the information recorded at the convergence point is bit data "1." On the other hand, when bit data "0" are recorded at the convergence point, the light having converged in the recording layer of the recording medium 161 is not reflected at the convergence point. With no light being received at the light reception part of the optical detector 134, it is determined that the information recorded at the convergence point is bit data "0."

In the above description, the active wavelength plate 122 serves as λ plate for reproducing information from the recording medium 161. The active wavelength plate 122 can serve as a λ/2 plate. In such a case, the light reception part of the optical detector 134 receives no light when bit data "1" are recorded at the convergence point. Conversely, the light reception part of the optical detector 134 receives light when bit data "0" are recorded at the convergence point.

The mechanism of recording information on the recording medium 161 and the mechanism of reproducing information from the recording medium 161 are the same as explained in Embodiment 2.

An optical information recording/reproducing device including the optical unit shown in FIG. 17 will be described. The optical information recording/reproducing device is the same as the one shown in FIG. 16. The optical unit 101e shown in FIG. 17 is used as the optical unit 101.

Using a not-shown motor, the relay lens drive circuit 162 changes the interval of the relay lens 163 to move the convergence point of the first light in the thickness direction of the recording medium 161 upon reproduction of information from the recording medium 161. Furthermore, the relay lens drive circuit 162 changes the interval of the relay lens 173 so that the first light reflected by the recording medium 161 always converges on the light reception part of the optical detector 134.

The active wavelength plate drive circuit 111 applies no voltage or a voltage V1 to the electrooptical crystal contained in the active wavelength plate 122 based on recording signals generated by the recording signal generation circuit 112 upon recording of information on the recording medium 161. More specifically, the active wavelength plate drive circuit 111 applies no voltage to the electrooptical crystal when the recording signals are bit data "1" and applies a voltage V1 to the electrooptical crystal when the recording signals are bit data "0." Furthermore, the active wavelength plate drive circuit 111 applies no voltage to the electrooptical crystal contained in the active wavelength plate 122 upon reproduction of information from the recording medium 161.

Figure 18:
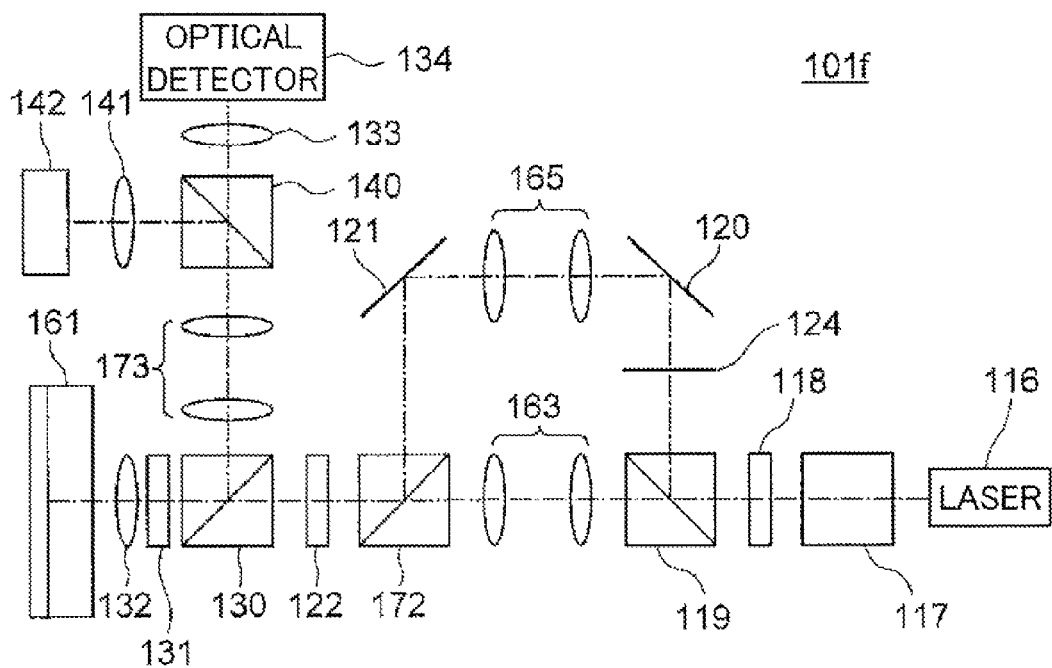
FIG. 18 A block diagram showing an optical unit of Embodiment 6 of the present invention.
Figure 19:
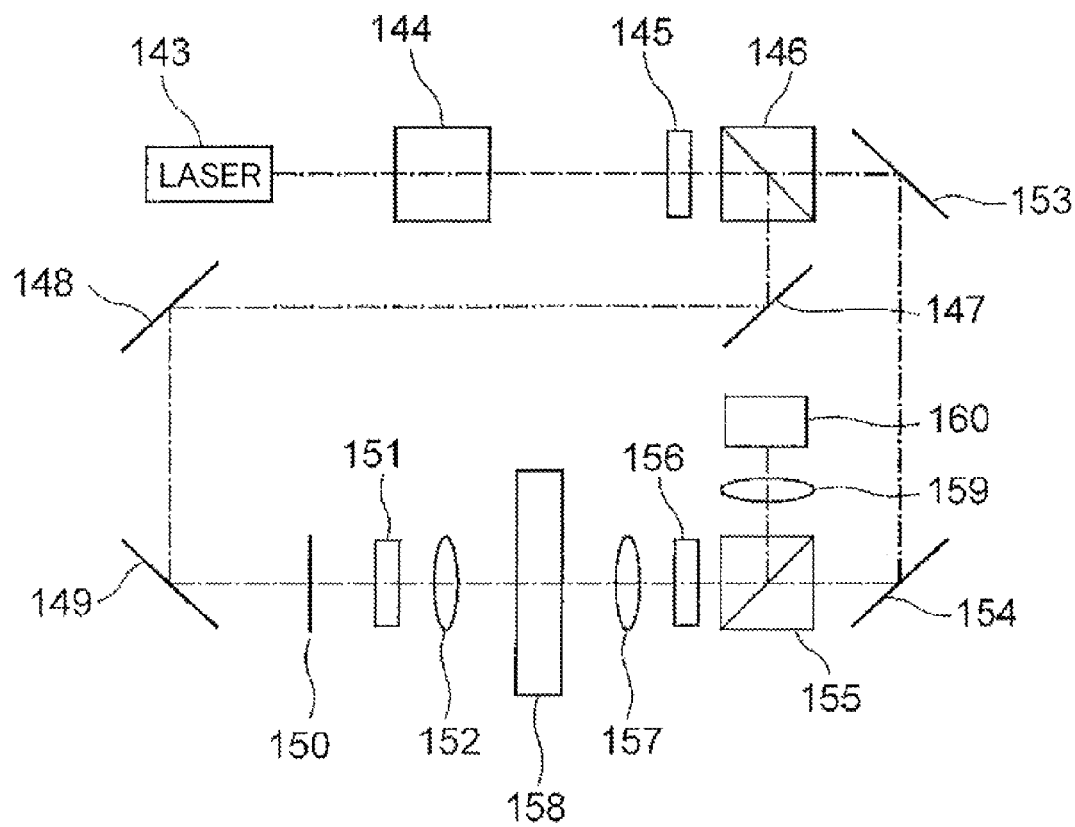
FIG. 19 A block diagram showing the three-dimensional recording/reproducing optical unit described in Non-Patent Literature 1.

Embodiment 6 of the present invention will be described. FIG. 18 shows an optical unit of Embodiment 6 of the present invention. An optical unit 101f of this embodiment is constructed by adding a polarized beam splitter 140, a convex lens 141, and a detector 142 to the optical unit 101e shown in FIG. 17.

The active wavelength plate 122 can be switched among serving as a λ plate, serving as a λ/2 plate, and serving as a λ/4 plate for the incident light. The active wavelength plate 122 is controlled to serve as a λ/4 plate for the incident light upon reproduction of information from the recording medium 161.

The optical unit 101f operates the same way as the optical unit 101e upon recording of information on the recording medium 161.

For reproducing information from the recording medium 161, the first light becomes a slightly converging light after transmission through the relay lens 163. Entering the polarized beam splitter 172 as P polarization, almost 100% of the light is transmitted through it to enter the active wavelength plate 122. Here, the light entering the active wavelength plate 122 is transformed from a linearly polarized light to a clockwise circularly polarized light after transmission through it. Approximately 50% of the light is transmitted through the beam splitter 130 and transformed by the λ/4 plate 131 from a clockwise circularly polarized light to a linearly polarized light. The objective lens 132 converges the light on the way to the reflective layer in the recording layer of the recording medium 161. The light includes both clockwise circular polarization components and counterclockwise circular polarization components. Here, blocked by the shutter 124, the second light does not head for the recording medium 161.

When bit data "1" are recorded at the convergence point, the clockwise circular polarization components of the light having converged in the recording layer of the recording medium 161 are partly reflected at the convergence point as a clockwise circularly polarized light while the counterclockwise circular polarization components are not reflected at the convergence point. The light reflected at the convergence point passes through the objective lens 132 in the reverse direction and is transmitted through the λ/4 plate 131, whereby it is transformed from a clockwise circularly polarized light to a linearly polarized light. Approximately 50% of the linearly polarized light is reflected by the beam splitter 130 and becomes a collimated light after transmission through the relay lens 173. Entering the polarized beam splitter 140 as P polarization, almost 100% of the light is transmitted through it. The convex lens 133 converges the light on the light reception part of the optical detector 134. With light being received at the light reception part of the optical detector 134 and no light being received at the light reception part of the detector 142, it is determined that the information recorded at the convergence point is bit data "1."

On the other hand, when bit data "0" are recorded at the convergence point, the counterclockwise circular polarization components of the light having converged in the recording layer of the recording medium 161 are partly reflected at the convergence point as a counterclockwise circularly polarized light while the clockwise circular polarization components are not reflected at the convergence point. The light reflected at the convergence point passes through the objective lens 132 in the reverse direction and is transmitted through the λ/4 plate 131, whereby it is transformed from a counterclockwise circularly polarized light to a linearly polarized light. Approximately 50% of the light is reflected by the beam splitter 130 and becomes a collimated light after transmission through the relay lens 173. Entering the polarized beam splitter 140 as S polarization, almost 100% of the collimated light is reflected by it. The convex lens 141 converges the light on the light reception part of the detector 142. With light being received at the light reception part of the detector 142 and no light being received at the light reception part of the optical detector 134, it is determined that the information recorded at the convergence point is bit data "0."

An optical information recording/reproducing device including the optical unit shown in FIG. 18 will be described. The optical information recording/reproducing device is the same as the one shown in FIG. 16. The optical unit 101*f* shown in FIG. 18 is used as the optical unit 101.

The active wavelength plate drive circuit 111 applies the voltage V2 to the electrooptical crystal contained in the active wavelength plate 122 upon reproduction of information from the recording medium 161. The amplifying circuit 108 performs differential amplification on electric signals output from the optical detectors 134 and 142 upon reproduction of information from the recording medium 161.

Although the shutter 124 is used as a light irradiation state switching means in the above Embodiments 1 to 6, an active wavelength plate can be used as the light irradiation state switching means. In such a case, the shutter 124 is eliminated and an active wavelength plate is provided in place of the λ/2 plate 118 in the optical unit 101*a* (FIG. 1), 101*b* (FIG. 8), 101*c* (FIG. 13), 101*d* (FIG. 14), 101*e* (FIG. 17), or 101*f* (FIG. 18). The active wavelength plate used as the light irradiation state switching means has the same structure as the active wavelength plates 122 and 128.

Light emerging from the laser 116 enters an active wavelength plate as a linearly polarized light having a polarization direction parallel to the sheet surface of FIG. 1, 8, 13, 14, 17, or 18. In FIG. 1, 14, 17, or 18, the active wavelength plate is controlled to serve as a λ/2 plate upon recording of information on the recording medium 103 or 161. Then, the light entering the active wavelength plate is transmitted through the active wavelength plate with the polarization direction rotated by 45°. Approximately 50% of the light is transmitted through the polarized beam splitter 119 as P polarization components and approximately 50% is reflected by the polarized beam splitter 119 as S polarization components. On the other hand, the active wavelength plate is controlled to serve as a λ plate upon reproduction of information from the recording medium 103 or 161. Then, the light entering the active wavelength plate is transmitted through the active wavelength plate without any change in polarization state. Entering the polarized beam splitter 119 as P polarization, almost 100% of the light is transmitted through it.

In FIG. 8 or 13, the active wavelength plate is controlled to serve as a λ/2 plate upon recording of information on the recording medium 103. Then, the light entering the active wavelength plate is transmitted through the active wavelength plate with the polarization direction rotated by 35°. Approximately 67% of the light is transmitted through the polarized beam splitter 119 as P polarization components and approximately 33% is reflected by the polarized beam splitter 119 as S polarization components. On the other hand, the active wavelength plate is controlled to serve as a λ plate upon reproduction of information from the recording medium 103. Then, the light entering the active wavelength plate is transmitted through the active wavelength plate without any change in polarization state. Entering the polarized beam splitter 119 as P polarization, almost 100% of the light is transmitted through it.

In an optical information recording/reproducing device using an active wavelength plate as the light irradiation state switching means, an active wavelength plate drive circuit is used as the light irradiation state switching means drive circuit. In such a case, an active wavelength plate drive circuit is provided in place of the shutter drive circuit 107. The active wavelength plate drive circuit applies a voltage V1 to the electrooptical crystal contained in the active wavelength plate upon recording of information on the recording medium 103 or 161 and applies no voltage to the electrooptical crystal contained in the active wavelength plate upon reproduction of information from the recording medium 103 or 161.

Finally, the minimum structure of the present invention and effects of the minimum structure will be described. The optical unit of the present invention comprises, as the minimum structure, a light source; a light dividing means for dividing light emerging from the light source into a first light and a second light; a light converging means for converging the first and second lights at the same position in the recording layer of an optical recording medium in the manner that they face each other; a polarization state switching means for switching the polarization states of the first and second lights at the convergence point in the recording layer; and a light irradiation state switching means for switching between the state in which the optical recording medium is irradiated with both the first light and the second light and the state in which the optical recording medium is irradiated with only one of the first and second lights.

The optical information recording/reproducing device of the present invention comprises, as the minimum structure, a light source; a light dividing means for dividing light emerging from the light source into a first light and a second light; a light converging means for converging the first and second lights at the same position in the recording layer of an optical recording medium in the manner that they face each other; a polarization state switching means for switching the polarization states of the first and second lights at the convergence point in the recording layer; a polarization state switching means drive circuit driving the polarization state switching means according to recording data upon recording of information on the optical recording medium; a light irradiation state switching means for switching between the state in which the optical recording medium is irradiated with both the first light and the second light and the state in which the optical recording medium is irradiated with only one of the first and second lights; and a light irradiation state switching means drive circuit driving the light irradiation state switching means in the manner that both the first light and the second light irradiate the optical recording medium as recording light upon recording of information on the optical recording medium and only one of the first and second lights irradiates the optical recording medium as reproducing light upon reproduction of information from the optical recording medium.

The optical information recording method of the present invention comprises the minimum structure wherein light emerging from a light source is divided into a first light and a second light; the first and second lights are made to converge at the same position in the recording layer of an optical recording medium in which the polarization state of light can be recorded in the manner that they face each other; the polarization states of the first and second lights at the convergence point in the recording layer are switched according to recording data to record the polarization profile at the convergence point of the first and second lights.

In the present invention, the first light and second light are made to converge at the same position in a recording layer and form a hologram in the recording layer. In doing so, the polarization states of the first and second lights at the convergence point are switched according to recording data. In the present invention, the polarization states at the convergence point are switched according to recording data and the polarization profile is recorded as a hologram in the recording layer. The recorded data are identified from the polarization profile of the hologram. In the present invention, a hologram is formed in the recording layer for any recording data. If a hologram having a polarization profile according to some data has been recorded in the recording layer, a hologram having a polarization profile corresponding to data different from the recorded data will be recorded without deleting the existing hologram. In other words, the present invention allows for overwriting of information.

The present invention is specifically illustrated and described with reference to exemplary embodiments. The present invention is not confined to the above embodiments and their modifications. As apparent to a person of ordinary skill in the field, various modifications can be made to the present invention without departing from the spirit and scope of the present invention set forth in the attached claims.

The invention claimed is:

1. An optical information recording/reproducing device using an optical recording medium having a recording layer in which the polarization state of light can be recorded, comprising:
   a light source;
   a light dividing means for dividing light emerging from said light source into a first light and a second light;
   a light converging means for converging said first and second lights at the same position in said recording layer in the manner that they face each other;
   a polarization state switching means for switching the polarization states of said first and second lights at the convergence point in said recording layer;
   a polarization state switching means drive circuit driving said polarization state switching means according to recording data upon recording of information on said optical recording medium;
   a light irradiation state switching means for switching between the state in which said optical recording medium is irradiated with both said first light and said second light and the state in which said optical recording medium is irradiated with only one of said first and second lights; and
   a light irradiation state switching means drive circuit driving said light irradiation state switching means in the manner that both said first light and said second light irradiate said optical recording medium as recording light upon recording of information on said optical recording medium and only one of said first and second lights irradiates said optical recording medium as reproducing light upon reproduction of information from said optical recording medium.

2. The optical information recording/reproducing device according to claim 1 wherein said polarization state switching means drive circuit drives said polarization state switching means in the manner that the polarization states of said first and second lights at the convergence point in said recording layer conform to first and second linear polarization having polarization directions perpendicular to each other, respectively, when said recording data correspond to "1" and the polarization states of said first and second lights at the convergence point in said recording layer conform to third and fourth linear polarization having polarization directions perpendicular to each other and making an angle of 45° with those of said first and second linear polarization, respectively, when said recording data correspond to "0."

3. The optical information recording/reproducing device according to claim 2 wherein said device further comprises an optical detector receiving said reproducing light reflected by said optical recording medium and outputting reproduction signals upon reproduction of information from said optical recording medium; and
   said polarization state switching means drive circuit drives said polarization state switching means in the manner that the polarization state of said reproducing light at the convergence point in said optical recording medium conforms to either one of said first to fourth linear polarization.

4. The optical information recording/reproducing device according to claim 1 wherein said polarization state switching means drive circuit drives said polarization state switching means in the manner that the polarization states of said first and second lights at the convergence point in said recording layer conform to either one of clockwise circular polarization and counterclockwise circular polarization when said recording data correspond to "1" and the polarization states of said first and second lights at the convergence point in said recording layer conform to the other of clockwise circular polarization and counterclockwise circular polarization when said recording data correspond to "0."

5. The optical information recording/reproducing device according to claim 4 wherein said device further comprises an optical detector receiving said reproducing light reflected by said optical recording medium and outputting reproduction signals upon reproduction of information from said optical recording medium; and
   said polarization state switching means drive circuit drives said polarization state switching means in the manner that the polarization state of said reproducing light at the convergence point in said recording layer conforms to either one of clockwise circular polarization and counterclockwise circular polarization upon reproduction of information from said optical recording medium.

6. The optical information recording/reproducing device according to claim 4 wherein said device further comprises a polarized light separation means for separating said reproducing light reflected by said optical recording medium into two polarization components perpendicular to each other and an optical detector receiving said two polarization components and outputting the difference signals between the two polarization components as reproduction signals; and
   said polarization state switching means further has a function of conforming the polarization state of said reproducing light at the convergence point in said recording layer to linear polarization, and said polarization state switching means drive circuit drives said polarization state switching means in the manner that the polarization state of said reproducing light at the convergence point in said recording layer conforms to linear polarization upon reproduction of information from said optical recording medium.

7. The optical information recording/reproducing device according to claim 1 wherein an optical recording medium having a first entrance face and second entrance face parallel to said recording layer and holding the recording layer between them is used as said optical recording medium, and said first and second lights enter said optical recording medium from said first and second entrance faces, respectively, and converge in said recording layer.

8. The optical information recording/reproducing device according to claim 1 wherein an optical recording medium having an entrance face parallel to said recording layer and a reflective layer on the opposite side of said recording layer to said entrance face is used as said optical recording medium, and said first light enters said optical recording medium from said entrance face and converges on the way to said reflective layer in said recording layer, and said second light enters said optical recording medium from said entrance face, is transmitted through said recording layer, is reflected by said recording layer, and converges on the way back to said entrance face in said optical recording medium.

9. An optical unit used in an optical information recording/reproducing device intended for the use of an optical recording medium having a recording layer in which the polarization state of light can be recorded, comprising:
- a light source;
- a light dividing means for dividing light emerging from said light source into a first light and a second light;
- a light converging means for converging said first and second lights at the same position in said recording layer in the manner that they face each other;
- a polarization state switching means for switching the polarization states of said first and second lights at the convergence point in said recording layer; and
- a light irradiation state switching means for switching between the state in which said optical recording medium is irradiated with both said first light and said second light and the state in which said optical recording medium is irradiated with only one of said first and second lights.

10. An optical information recording method wherein:
- light emerging from a light source is divided into a first light and a second light;
- said first and second lights are made to converge at the same position in the recording layer of an optical recording medium in which the polarization state of light can be recorded in the manner that they face each other;
- the polarization states of said first and second lights at the convergence point in said recording layer are switched according to recording data to record the polarization profile at the convergence point of said first and second lights.

* * * * *